(12) United States Patent
Kelley et al.

(10) Patent No.: US 11,608,971 B2
(45) Date of Patent: Mar. 21, 2023

(54) LUMINAIRE SYSTEM FACILITATING MODULAR ENHANCEMENT

(71) Applicant: HAMPTON PRODUCTS INTERNATIONAL CORPORATION, Foothill Ranch, CA (US)

(72) Inventors: Kim Kelley, The Woodlands, TX (US); Jon Fong Quan, Fountain Valley, CA (US); Howard Shen, Mission Viejo, CA (US); Hossein Molaie Shargh, Rancho Santa Margarita, CA (US); Kyrilous Basilious, Corona, CA (US)

(73) Assignee: HAMPTON PRODUCTS INTERNATIONAL CORPORATION, Foothill Ranch, CA (US)

( * ) Notice: Subject to any disclaimer, the term of this patent is extended or adjusted under 35 U.S.C. 154(b) by 0 days.

(21) Appl. No.: 17/029,496

(22) Filed: Sep. 23, 2020

(65) Prior Publication Data
US 2022/0090770 A1 Mar. 24, 2022

(51) Int. Cl.
*F21V 23/04* (2006.01)
*F21V 23/02* (2006.01)
*F21S 8/00* (2006.01)

(52) U.S. Cl.
CPC ........ *F21V 23/0435* (2013.01); *F21V 23/023* (2013.01); *F21S 8/033* (2013.01)

(58) Field of Classification Search
CPC .... F21V 23/023; F21V 23/0435; F21S 8/033; F21S 2/005
See application file for complete search history.

(56) References Cited

U.S. PATENT DOCUMENTS

| | | | | |
|---|---|---|---|---|
| 7,804,252 B2 * | 9/2010 | Chen | ...................... | H05B 47/11 |
| | | | | 315/158 |
| 9,335,750 B2 * | 5/2016 | Lu | ....................... | H04L 12/2825 |
| 9,615,066 B1 | 4/2017 | Tran et al. | | |
| 9,894,740 B1 * | 2/2018 | Liszt | ...................... | H05B 45/37 |
| 9,900,091 B2 | 2/2018 | Choi et al. | | |
| 10,117,309 B1 * | 10/2018 | Fu | .......................... | H05B 45/12 |

(Continued)

OTHER PUBLICATIONS

Karlicek, Jr.; "Lighting and the Internet of Things"; IES Illuminating Engineering Society; https://www.ies.org/fires/lighting-and-the-internet-of-things/ Jul. 19, 2018; 7 Pages.

*Primary Examiner* — Seokjin Kim
(74) *Attorney, Agent, or Firm* — KOS IP Law LLP; Glen L Nuttall

(57) ABSTRACT

A light fixture can be electrically connected to a module that can add certain functionality and/or alter the way the light fixture is controlled. A module base includes a module receiver configured to receive one of a plurality of modules. At least the module base is connected to input power. When a first module is coupled to the module base, the combination of the light fixture and module has a first range of functionality dictated at least in part by the functionality of the first module. When the first module is removed and replaced with a second module, the combination of the light fixture and the module has a second range of functionality dictated at least in part by the functionality of the second module.

16 Claims, 19 Drawing Sheets

(56) References Cited

U.S. PATENT DOCUMENTS

| | | |
|---|---|---|
| 10,172,212 B2 | 1/2019 | Kelley et al. |
| 10,271,395 B2 | 4/2019 | Tang et al. |
| 10,531,540 B2 | 1/2020 | Lee et al. |
| 10,565,835 B2 | 2/2020 | Harrington et al. |
| 2002/0018344 A1* | 2/2002 | Sears, Jr. ............... F21V 17/18 362/276 |
| 2004/0267501 A1* | 12/2004 | Freed ..................... H02J 7/025 702/184 |
| 2012/0250728 A1* | 10/2012 | Pischl ..................... H04B 3/23 375/E1.001 |
| 2013/0261774 A1* | 10/2013 | Lu .......................... H04L 12/66 700/90 |
| 2020/0013246 A1 | 1/2020 | Vega et al. |

* cited by examiner

LUMINAIRE SYSTEM FACILITATING MODULAR ENHANCEMENT

BACKGROUND

The present disclosure relates to the field of luminaires, and more particularly a luminaire configured to accept one or more modules that may add or modify luminaire functionality.

Traditionally, luminaires, such as light fixtures, have had limited abilities beyond simply providing light. As technology marches forward there is a desire to increase the capabilities of luminaires. For example, there is a desire to make light fixtures "smart" in order to interact as part of the Internet of Things (IoT) and add capabilities. However, upgrading a light fixture to, for example, include communications functionality or to incorporate one or more sensors and control paradigms, typically requires replacing the fixture with an entirely new fixture. This is both expensive and wasteful. Also, if a secondary function of the luminaire were to malfunction, the entire luminaire, again, must be replaced even though its main lighting function may remain intact. Further, it is anticipated that a replacement "smart" luminaire may become technologically outdated in a relatively short time. To catch up to rapidly-evolving technology it may be necessary to replace the entire fixture than attempt to modify it to add updated components. Since the entire luminaire may be replaced during such upgrades, durable portions of the luminaire are wastefully discarded.

SUMMARY

The present specification presents embodiments of luminaires having a native functional structure, but which are configured to receive one or more different types of modules that add secondary functional structures. Such modules can inexpensively be changed and replaced to provide updated secondary functional structure while preserving the native functional structure of the luminaire.

In accordance with one embodiment, the present specification provides a luminaire configured to be selectively coupled with a separately-formed module having a module electrical interface and a module physical interface. The luminaire comprises a luminaire body configured to be mounted on a structure and comprising a light mount and a module receiver. The light mount is configured to support a lighting element, and the module receiver configured to receive the module physical interface. A fastener is configured to maintain the module physical interface connected to the luminaire body at the module receiver. The luminaire body encloses a native electrical structure configured to communicate electricity from a power input source to the light mount and to communicate electricity from the power input source to a body interface. The body interface is configured to engage and provide power to the module electrical interface when the module physical interface is received in the module receiver of the luminaire body so that the native electrical structure is electrically coupled with the module interface.

In some embodiments the native electrical structure comprises a main switch interposed between the power input source and the body interface, and a native position of the main switch is open between the power input source and the body interface so that no electricity is communicated from the power input source to the body interface when the main switch is in the native position. In some such embodiments, the main switch is configured so that when the module physical interface is attached at the module receiver, the main switch is moved to a connected position in which the power input source is electrically connected to the body interface.

In another embodiment the native electrical structure comprises a native processor configured to communicate data to and from the body interface.

In yet another embodiment the luminaire body is configured to receive an AC power input from the structure to which the luminaire is mounted.

In accordance with another embodiment, the present specification provides a luminaire system, comprising a native luminaire having a luminaire body configured to be mounted on a structure and comprising a light mount and a luminaire coupler, the light mount configured to support a lighting element. The system also comprises a plurality of modules, each of the plurality of modules comprising a module body having a module coupler, the module coupler configured to be selectively physically coupled with the luminaire coupler so that the module body is physically coupled with the luminaire body. The luminaire body encloses a native electrical structure configured to communicate electricity from a power input source to the light mount and to communicate electricity from the power input source to a body interface. Each module body encloses a module electrical structure comprising a module interface, a module processor unit and a peripheral functional structure. When the module body is physically coupled to the luminaire body, the native electrical structure is electrically coupled with the module interface so that electricity from the power input source is communicated from the body interface to the module interface and to the module processor unit.

In another embodiment when the module body is physically coupled to the luminaire body, the module processor unit controls delivery of power from the power input source to the lighting element.

In yet another embodiment, the peripheral functional structure comprises a wireless communication structure configured to enable wireless communication of data between the module processor unit and a remote computing device. In some such embodiments, the peripheral functional structure comprises one or more of a sensor, camera, microphone, and speaker in communication with the module processor unit, and wherein data from the peripheral functional structure can be shared with the remote computing device.

In a further embodiment, the native electrical structure comprises a luminaire processor configured to control delivery of power from the power input source to the lighting element. In some such embodiments when the module is coupled to the native luminaire the module processor unit communicates data with the native processor unit. In additional embodiments, the module processor unit is configured to control the native processor unit.

In a yet further embodiment, a first one of the plurality of modules comprises a battery and a power conditioner configured to convert battery power from DC to AC and selectively deliver AC power to the module interface, and wherein the native electrical structure is configured to communicate AC power from the body interface to the lighting element.

In accordance with another embodiment, the present specification provides a method of modifying functionality of a native luminaire. The method includes coupling a first module to a luminaire body of the native luminaire, the luminaire body defining a lighting mount configured to attach a lighting element, the luminaire body comprising a native electrical structure configured to communicate electricity from a power source to the lighting mount and to deliver electricity from the power source to a luminaire interface, the first module comprising a module electrical structure comprising a module interface communicating with a module processor unit and a peripheral functional structure, wherein coupling the first module to the luminaire body comprises engaging the luminaire interface with the module interface so that electricity is communicated from the power source to the module interface. The method also includes directing electricity from the module interface to the module processing unit of the module and to the peripheral functional structure of the module, the peripheral functional structure obtaining peripheral data and communicating the peripheral data to the module processing unit. The module processing unit analyzes the peripheral data and selects a control routine based on the analysis.

Another embodiment additionally comprises the module processing unit controlling the peripheral functional structure in accordance with the selected control routine.

In yet another embodiment, when the first module is coupled to the luminaire body so that an energizing pathway to deliver electricity from the power source to the lighting mount is controlled by the module processing unit, and additionally comprising the module processing unit controlling the energizing pathway in accordance with the selected control routine.

Some such embodiments additionally comprise providing a second native luminaire that is functionally the same as the native luminaire and coupling a second module to the second native luminaire, the second module comprising a second module electrical structure comprising a second module interface communicating with a second module processor unit and a second peripheral functional structure, wherein coupling the second module to the second native luminaire comprises engaging a second luminaire interface of the second native luminaire with the second module interface so that electricity is communicated from the power source to the second module interface, the second module wirelessly receiving a control signal comprising the selected control routine from the first module, and the second module processor unit executing the selected control routine.

In yet another embodiment, one of the first and second modules comprises a motion sensor, and the embodiment additionally comprises communicating a positive reading from the motion sensor to the module processor unit of the first module, and the first module processor unit generating the control signal so that the selected control routine is to energize the lighting element of the associated native luminaire so that both the first and second native luminaires are turned on.

In accordance with yet another embodiment, the present specification describes a luminaire system, comprising a native luminaire having a luminaire body and a light mount configured to support a lighting element; a module base configured to be mounted on a structure and comprising a module receiver and a power line, the module receiver including a body interface, the power line configured to connect to a power input source and communicate electricity from the power input source to the body interface; a module comprising a module body having a module coupler, the module coupler configured to be selectively physically coupled with the module receiver so that the module body is physically coupled with the module base; the module body enclosing a module electrical structure comprising a module interface, a module processor unit and a peripheral functional structure; and the luminaire body enclosing a native electrical structure configured to receive electricity from one or more of the power input source and the module. When the module coupler is physically coupled with the module receiver, the body interface is electrically coupled with the module interface so that electricity from the power input source is communicated from the body interface to the module interface and to the module processor unit.

In some such embodiments a power output line extends from the body interface to the native electrical structure. In additional embodiments, when the module body is physically coupled to the module base, the module processor unit controls delivery of power from the power input source to the lighting element. In still further embodiments, an input portion of the body interface communicates an input electricity from the power line to the module and an output portion of the body interface communicates an output electricity from the module to the power output line, and wherein the module comprises a power conditioning structure configured to be controlled by the module processor unit. In yet additional embodiments the power conditioning structure is one of an on/off switch and a dimmer.

In an additional embodiment the luminaire body is configured to be mounted on the structure and spaced from the module base.

In yet an additional embodiment the module base is configured to receive the luminaire body mounted thereon.

In a further embodiment the peripheral functional structure comprises a wireless communication structure configured to enable wireless communication of data between the module processor unit and a remote computing device. In some such embodiments, the peripheral functional structure comprises one or more of a sensor, camera, microphone, and speaker in communication with the module processor unit, and wherein data from the peripheral functional structure can be shared with the remote computing device.

In a still further embodiment, the native electrical structure comprises a luminaire processor configured to control delivery of power from the power input source to the lighting element. Some such embodiments additionally comprise a communications wire extending from the module base to the luminaire body, and when the module is coupled to the module base the module processor unit communicates data with the native processor unit via the communication line. In still additional embodiments the module processor unit is configured to control the native processor unit.

Still another embodiment comprises a plurality of modules, each module comprising a module body configured to be selectively coupled with the module receiver so that each module body can be selectively physically coupled with the module base so that the body interface is electrically coupled with the module interface. In some such embodiments a first one of the plurality of modules comprises a battery and a power conditioner configured to convert battery power from DC to AC and selectively deliver AC power to the module interface, and wherein the native electrical structure is configured to communicate AC power from the body interface to the lighting element.

In yet another embodiment, the module base comprises a main switch interposed between the power line and the body interface, and wherein a native position of the main switch is open between the power line and the body interface so that no electricity is communicated from the power line to the body interface when the main switch is in the native position. In further embodiments, the main switch is configured so that when the module is coupled with the module receiver, the main switch is moved from the native position to a connected position in which the power line is electrically connected to the body interface.

In accordance with yet another embodiment, the present specification provides a method of modifying functionality of a native luminaire. The method includes interposing a module base between a native luminaire and a power source so that an input interface of the module base is electrically coupled to the power source and an output interface of the module base is electrically coupled to a native electrical structure of the native luminaire, the native luminaire having a luminaire body defining a lighting mount configured to support a lighting element, the native electrical structure configured to communicate electricity to the lighting mount. The method further includes coupling a first module to the module base, wherein coupling the first module to the module base comprises engaging the input interface of the module base with a module input interface of the first module and engaging the output interface of the module base with a module output interface of the first module so that electricity is communicated from the power source to a first module electrical structure, the first module electrical structure configured to provide power to a module processor unit and a peripheral functional structure. The peripheral functional structure obtains peripheral data and communicates the peripheral data to the module processing unit. The module processing unit analyzes the peripheral data and selects a control routine based on the analysis. The module processing unit controls a power conditioning structure of the module to adjust an output power communicated to the module output interface in accordance with the selected control routine.

An additional embodiment additionally comprises the module processing unit controlling the peripheral functional structure in accordance with the selected control routine.

Yet an additional embodiment comprises providing a kit comprising the module base, a module power cable configured to deliver power to the module base, and a module power output cable configured to deliver power from the module base, electrically coupling the module power cable to the power source, and electrically coupling the module power output cable to the native electrical structure of the native luminaire.

DESCRIPTION

Figure 1:
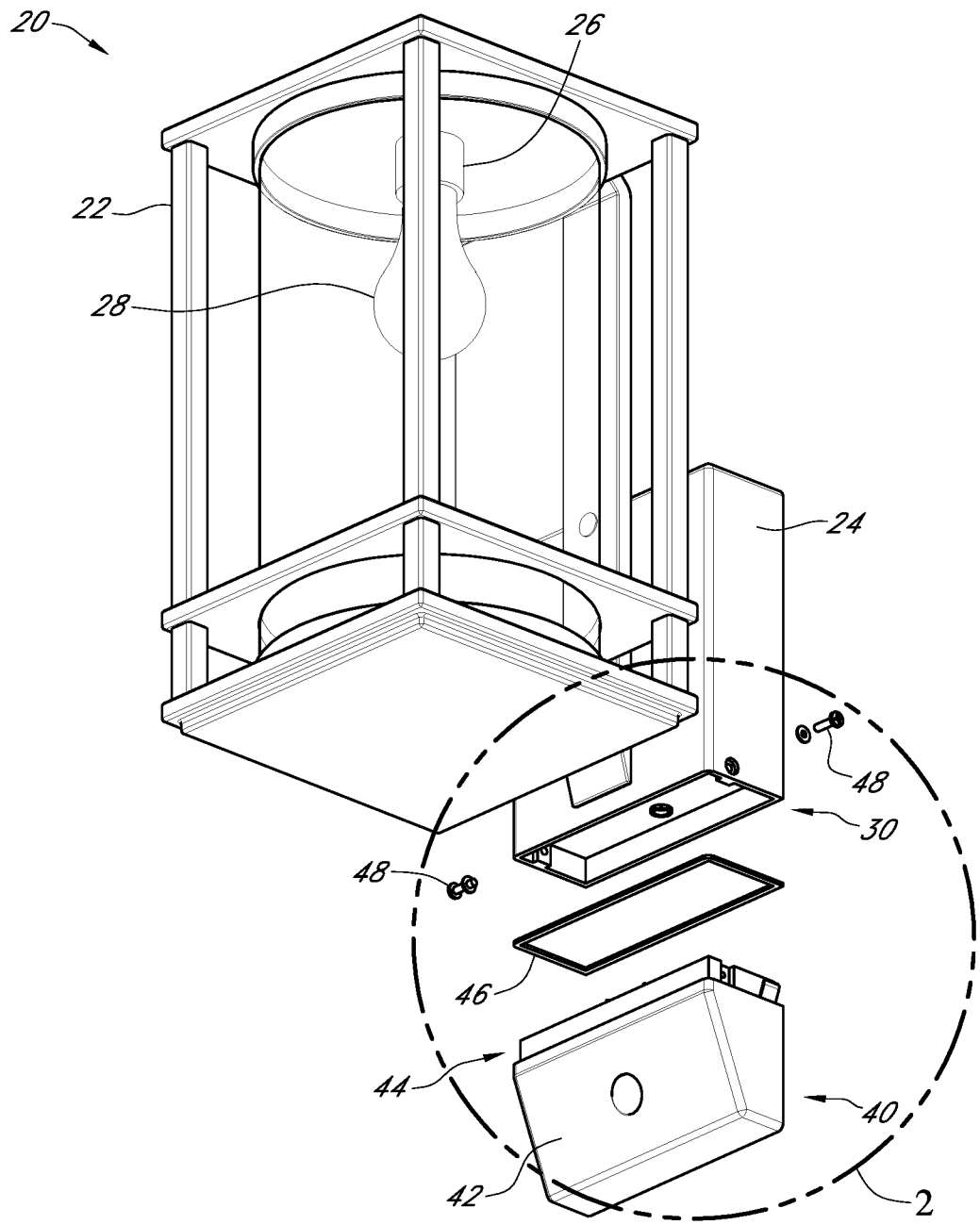
FIG. 1 is a perspective view of an embodiment of a luminaire configured to receive a module.
Figure 2:
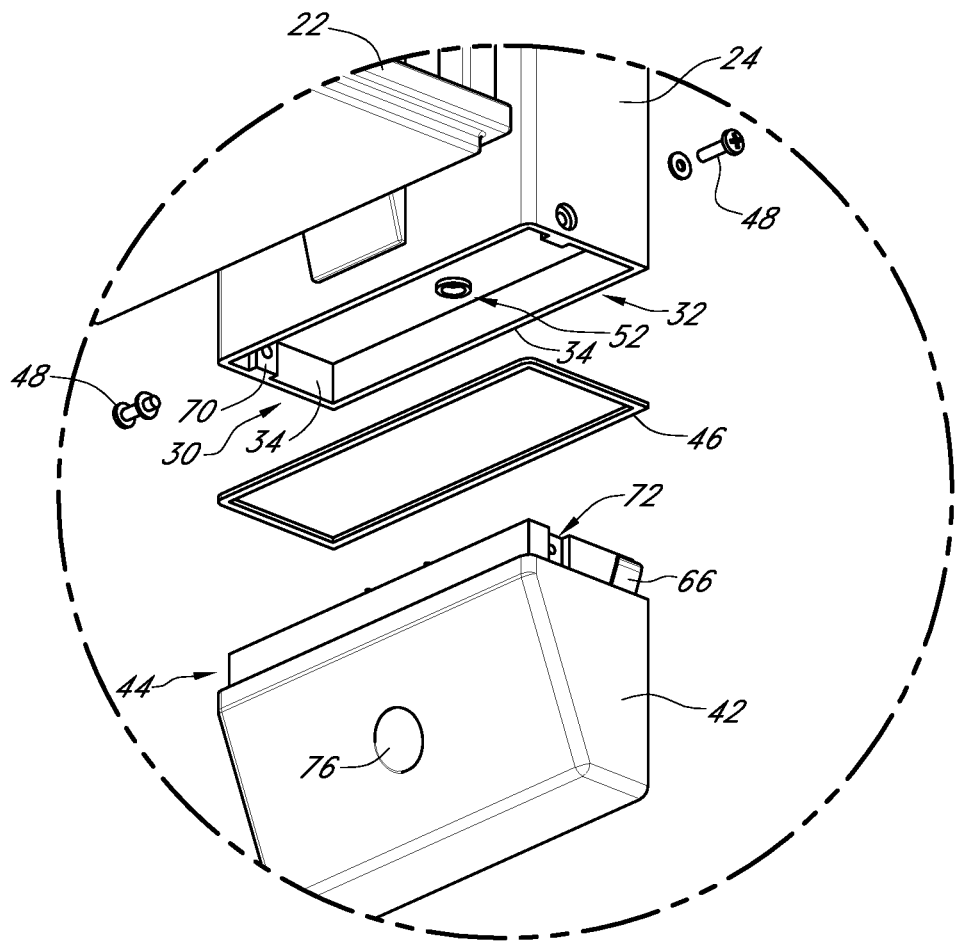
FIG. 2 is a close-up view taken along line 2-2 of FIG. 1
Figure 3:
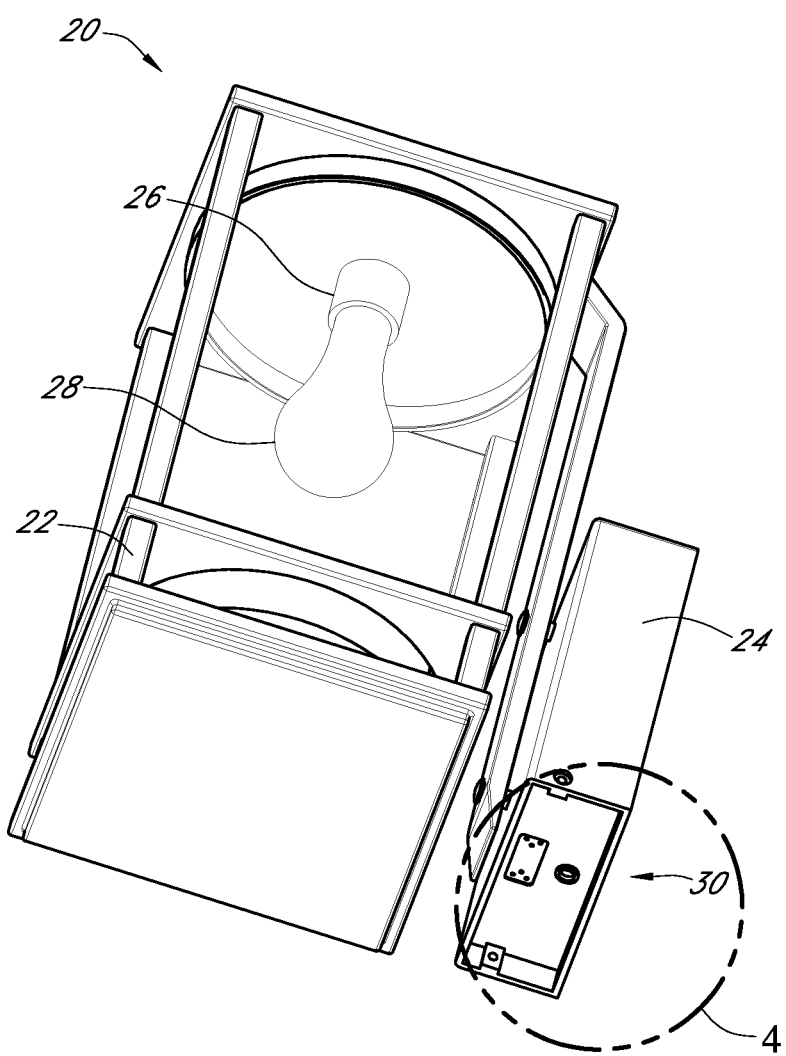
FIG. 3 is a bottom perspective view of the embodiment of FIG. 1.
Figure 4:
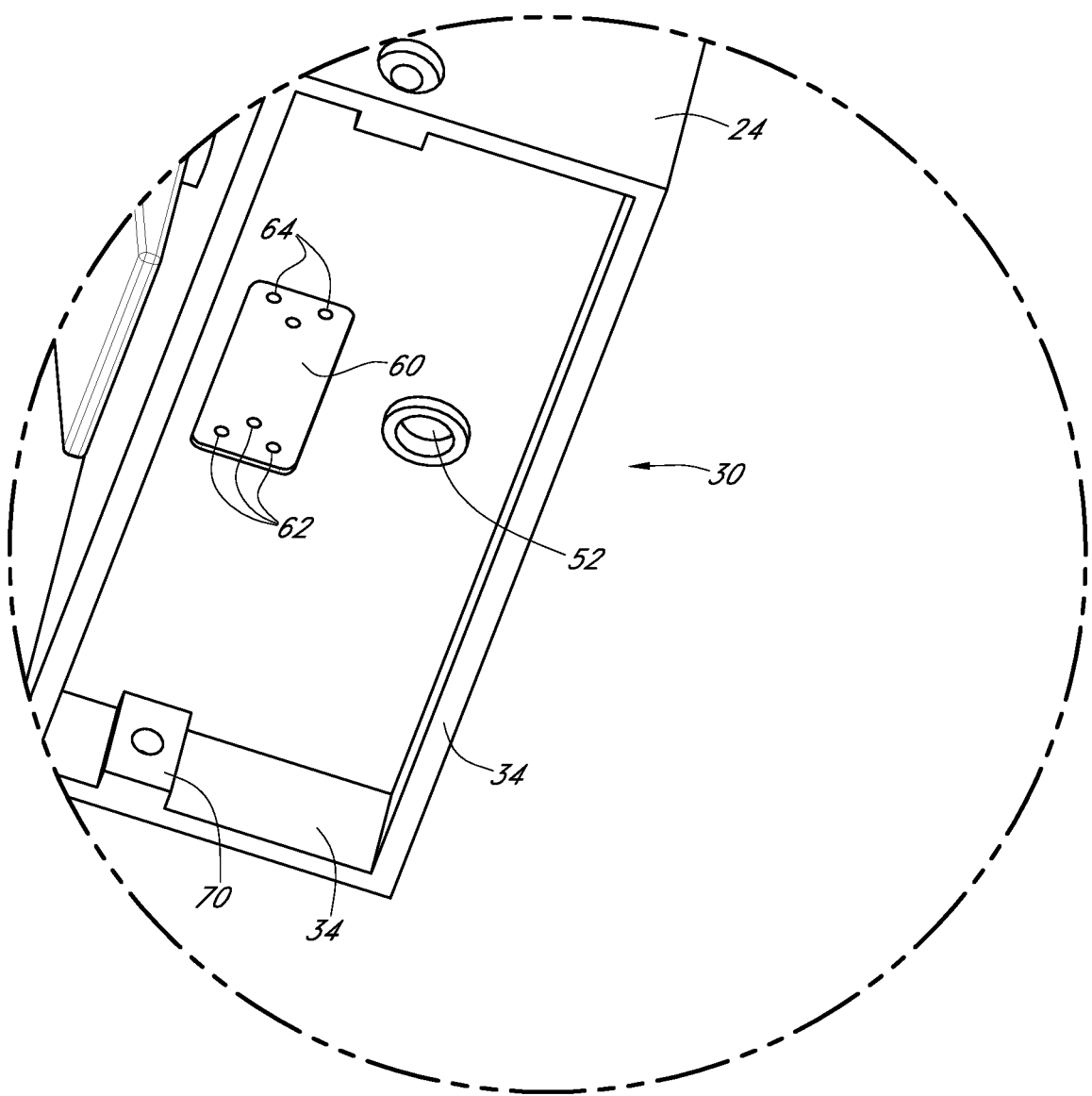
FIG. 4 is a close-up view taken along line 4-4 of FIG. 3
Figure 5:
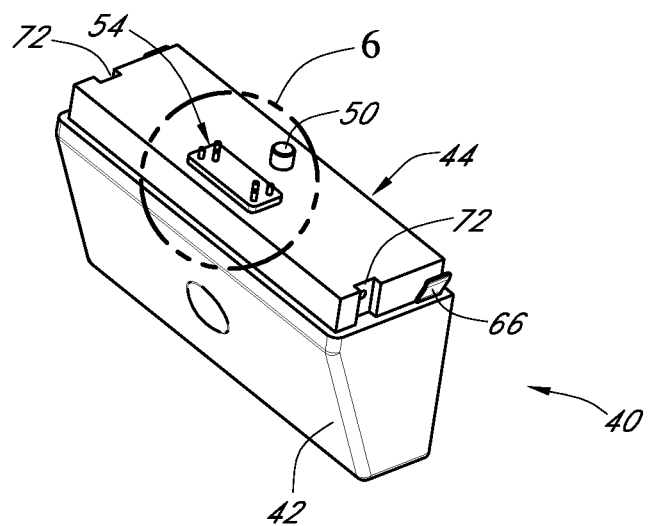
FIG. 5 is a perspective view of one embodiment of a module configured for use with the luminaire of FIG. 1.
Figure 6:
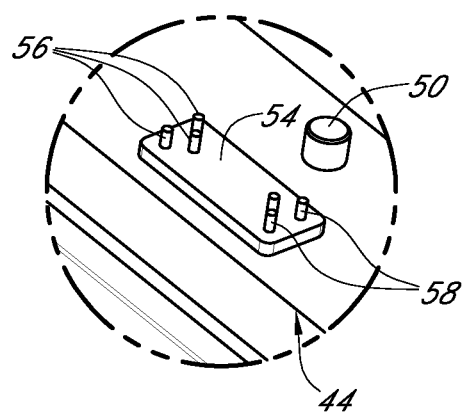
FIG. 6 is a close-up view taken along line 6-6 of FIG. 5.

With initial reference to FIGS. 1-6, a luminaire 20—which is a coach-style light fixture in the current embodiment—comprises a fixture body 22 configured with a base 24 for mounting the luminaire 20 on a permanent structure such as, for example, a wall of a residence or commercial building, and a light mount 26 for holding a lighting element 28 such as an incandescent or LED light bulb or an LED-based light engine not in traditional bulb form. Some luminaires may have LED-based light engines. In some such embodiments, both a light mount and lighting element can be incorporated into, for example, the LED-based light engine. Preferably, the luminaire 20 is configured to receive AC input power from the structure communicated through the body 24 and to the light mount 26 to provide power to illuminate the lighting element 28.

The body 22 of the luminaire includes a module receiver 30 comprising a cavity 32 defined by receiver walls 34. A module 40 comprises a module body 42 having a coupler portion 44 at one end. The illustrated coupler portion 44 is shaped complementarily to an inner surface of the receiver walls 34 and is configured to fit snugly within the module receiver 30. In the illustrated embodiment, a gasket 46 fits between the luminaire body 22 and the module 40 and is configured so that the connection between the body 22 and module 40 is substantially watertight as well as resistant to entry by pests such as insects. A plurality of fasteners 48 is provided to connect the seated module 40 to the luminaire body 22 and hold it securely in place. Other coupling means to fix the module 40 to the luminaire body can include an internal locking mechanism which can be unlocked remotely, spring-loaded tabs in slots, magnets, and memory wire.

Continuing with reference to FIGS. 1-6, a switch trigger 50 extends from the coupler portion 44 of the module 40. A switch trigger receiver 52 is formed in the receiver cavity 32 and is configured to receive the switch trigger 50. The switch trigger receiver 52 can be a spring-loaded button that when activated, switches power to flow to an electrical interface 60. When the module 40 is removed from the body 22, the switch trigger receiver 52 can spring back into place thereby cutting off power to the electrical interface 60. Alternatively, the switch trigger 50 can be provided on the body as, for example, a spring-loaded button extending from inside the module receiver 30 and can be depressed/activated when the module 40 is placed back within the module receiver 30.

A module interface 54 comprising a first group 56 of pins and a second group 58 of pins is also formed in the coupler portion 44 of the module 40. A corresponding body interface 60 is formed in the receiver cavity 32 and comprises a first group 62 of pin receivers configured to receive the first group 56 of pins, and a second group 64 of pin receivers configured to receive the second group 58 of pins.

A plurality of guides 70 are formed along the inside of the receiver walls 34 of the luminaire body 22. A corresponding plurality of guide slots 72 are formed in the coupler portion 44 of the module 40. Preferably the guides 70 are shaped complementarily to the guide slots 72 so that when the module coupler portion 44 is properly aligned with the module receiver 30, the guides 70 are aligned with the guide slots 72 and the module coupler portion 44 can be slid into the module receiver 30. When the guides 70 and guide slots 72 are properly aligned as such, the switch trigger 50 and switch trigger receiver 52 are also properly aligned, as are the first pin group 56 aligned with the first pin receiver group 62 and the second pin group 58 with the second pin receiver group 64. As the module 40 is slid into place and received in the receiver 30, each of the pins is also properly slid into place and received by the corresponding receiver.

In the illustrated embodiment, the fasteners 48 are placed through the aligned guides 70 and guide slots 72. However, it is to be understood that other specific configurations of fastener placement can be contemplated. Also, in the illustrated embodiment, one or more springs 66 are disposed on the module coupler portion 44 and configured to engage the luminaire body 22 when the module 40 is seated in the receiver 30 so as to reduce and/or eliminate vibration or other factors that may affect the fit of any of the pins 50, 56, 58 within corresponding receivers 52, 62, 64. In full, the module receiver 30 and coupler portion 44 are configured to provide a stable mechanical and electrical coupling between the module 40 and luminaire body 22.

As noted above, the luminaire body 22 preferably comprises a base 24 configured for mounting the fixture 20 onto a building or other permanent structure. In a preferred embodiment such mounting is anticipated to be permanent, and is unaffected by coupling or decoupling between a module 40 and the luminaire body 22. Preferably AC input power (such as "wall power") is delivered from the structure to the luminaire 20 via the permanent mounting relationship.

It is to be understood that other specific structures for coupling a module with a luminaire body can be employed, as well as other specific shapes and configurations, so long as a stable mechanical and electrical coupling is provided. For example, the illustrated receiver walls 34 define a generally rectangular receiver cavity 32. In other embodiments, a cavity may be generally circular, ovoid, or otherwise. In still further embodiments, a receiver cavity may be defined on the module, and the luminaire body may include a coupler portion that fits into the module's receiver cavity. Further, rather than using fasteners, some embodiments may hold a module 40 connected to the luminaire body 22 via a detent arrangement such as a ball & spring-style detent. Preferably, an alignment structure, such as the guides and guide slots, is provided so that the module interface and body interface are properly aligned so as to function effectively as an interface as discussed in more detail below.

Figure 7:
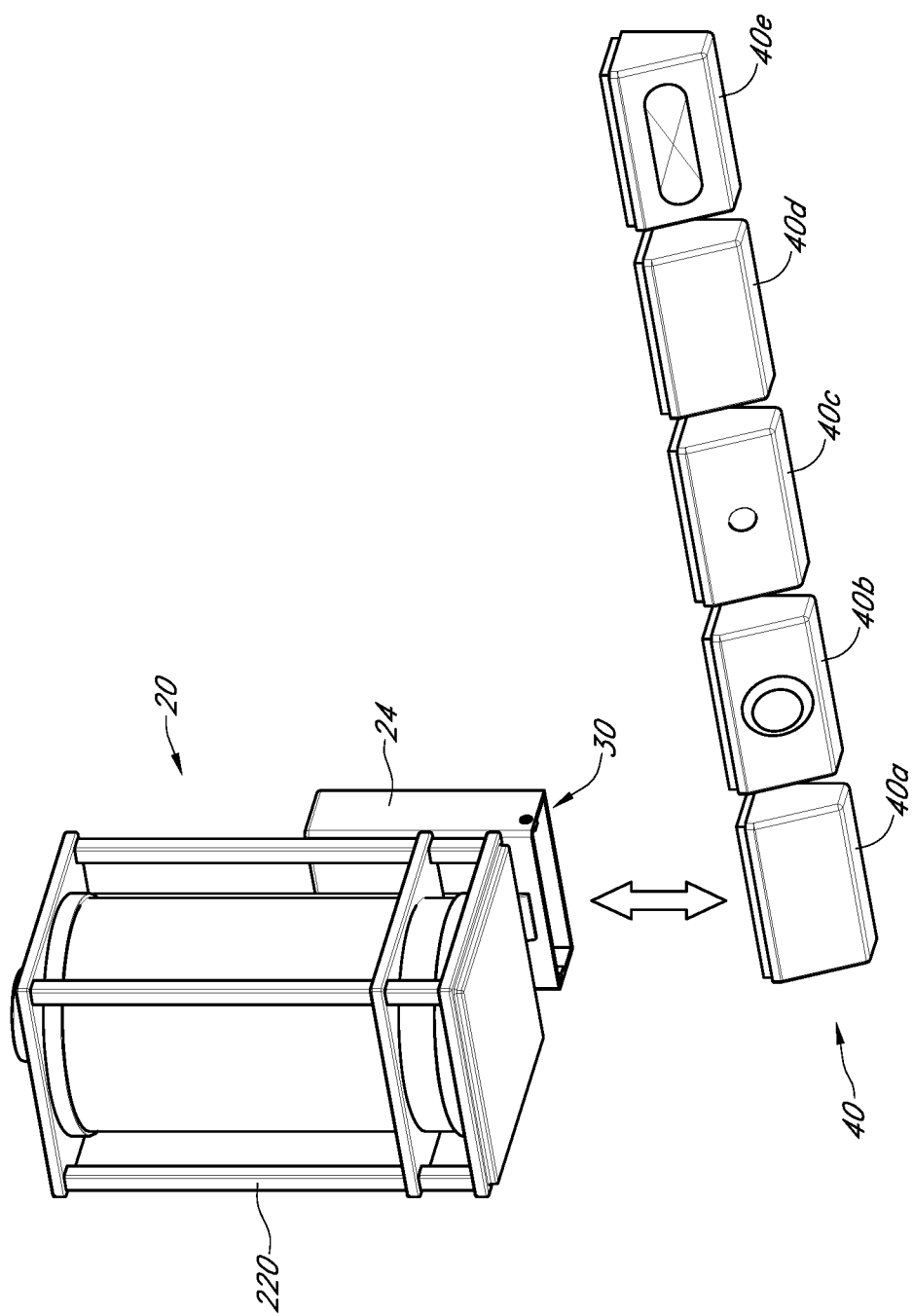
FIG. 7 is another perspective view of the luminaire of FIG. 1 depicting embodiments of several optional modules that could be fit with the luminaire.

With reference next to FIG. 7, any of a plurality of modules 40 can be selectively coupled and decoupled with a luminaire 20 in order to add functionality and/or alter control and functionality of the luminaire 20. For example, the luminaire 20 may initially be manufactured and sold with a "dummy" module 40a attached. The dummy module 40a would have no special function, nor any electronic circuitry or components of its own, and would not modify function of the luminaire 20, but would fill the module receiver 30, both protecting the module receiver 30 from elements and preserving a desired aesthetic of the luminaire 20. In one embodiment the dummy module 40a does not include a switch trigger 50. Thus, when the dummy module 40a is attached to the module 43 receiver, the switch trigger receiver 52 is not activated, and electric power is not delivered to the interface 60, but power is still connected to the luminaire 20 so that the lighting element 28 can be powered with or without a module 40 present. It is to be understood that dummy modules 40a can be provided of various shapes and colors so as to achieve a desired aesthetic.

As desired, a user can remove the dummy module 40a and replace it with another module having a desired function. For example, the dummy module 40a can be replaced with a camera module 40b, which is equipped with a camera lens 76 and internal circuitry and components configured to add digital camera functionality. Power to operate the camera can be supplied from the luminaire 20 through the aligned interfaces 54, 60, as will be discussed in more detail below.

It is to be understood that several types of modules 40, having various different functionalities, and combinations of functionalities, can selectively be attached to the luminaire 20. With continued reference to FIG. 7, some of the example types of modules include a passive infrared (PIR) module 40c, which can be configured with one or more PIR sensors for detecting, for example, motion, daylight or the like. Still another module can be a communications module 40d configured to include communications structure and circuitry to enable one or more types of wireless communication such as near-field, Bluetooth, Wi-Fi, cellular and satellite-based communications. Still another module is a future module 40e, containing functionality and associated structure not yet contemplated, but developed in the future to use future-developed technology to satisfy future-identified needs. It is to be understood, of course, that modules can include structure providing multiple functionalities, such as a camera combined with wireless communications. Some modules may even be configured to accept still additional modules attached thereto.

In some embodiments, addition of a module 40 will have no substantial effect on operation of the native luminaire 20. For example, if a camera module 40b that also has wireless communications functionality were added in one embodiment, the module 40b will be provided power via the luminaire 20, but its camera function would operate independently of the luminaire's 20 function, and communication of video generated by the camera may be wirelessly communicated independent of the luminaire 20 as well. In such an embodiment, the luminaire 20 may provide power to the module, but have no other interaction. Communication of such power can be accomplished via the engaged body interface 60 and module interface 54.

In additional embodiments, addition of a module 40 can fundamentally change operation of the luminaire 20. For example, in one embodiment when a PIR module 40c is added, the IR sensor of the module 40c may be configured to detect motion, and then control the lighting element 28 of the luminaire 20 to increase brightness (or, in some embodiments, turn on) for a period of time after such motion is detected. In such an embodiment, the luminaire 20 provides power to the module 40c, and the module in turn provides control to the luminaire 20. The engaged body interface 60 and module interface 54 can be configured to provide both communication of power from the luminaire 20 to the module 40, and also communication of a control signal from the module 40 to the luminaire 20.

Figure 8:
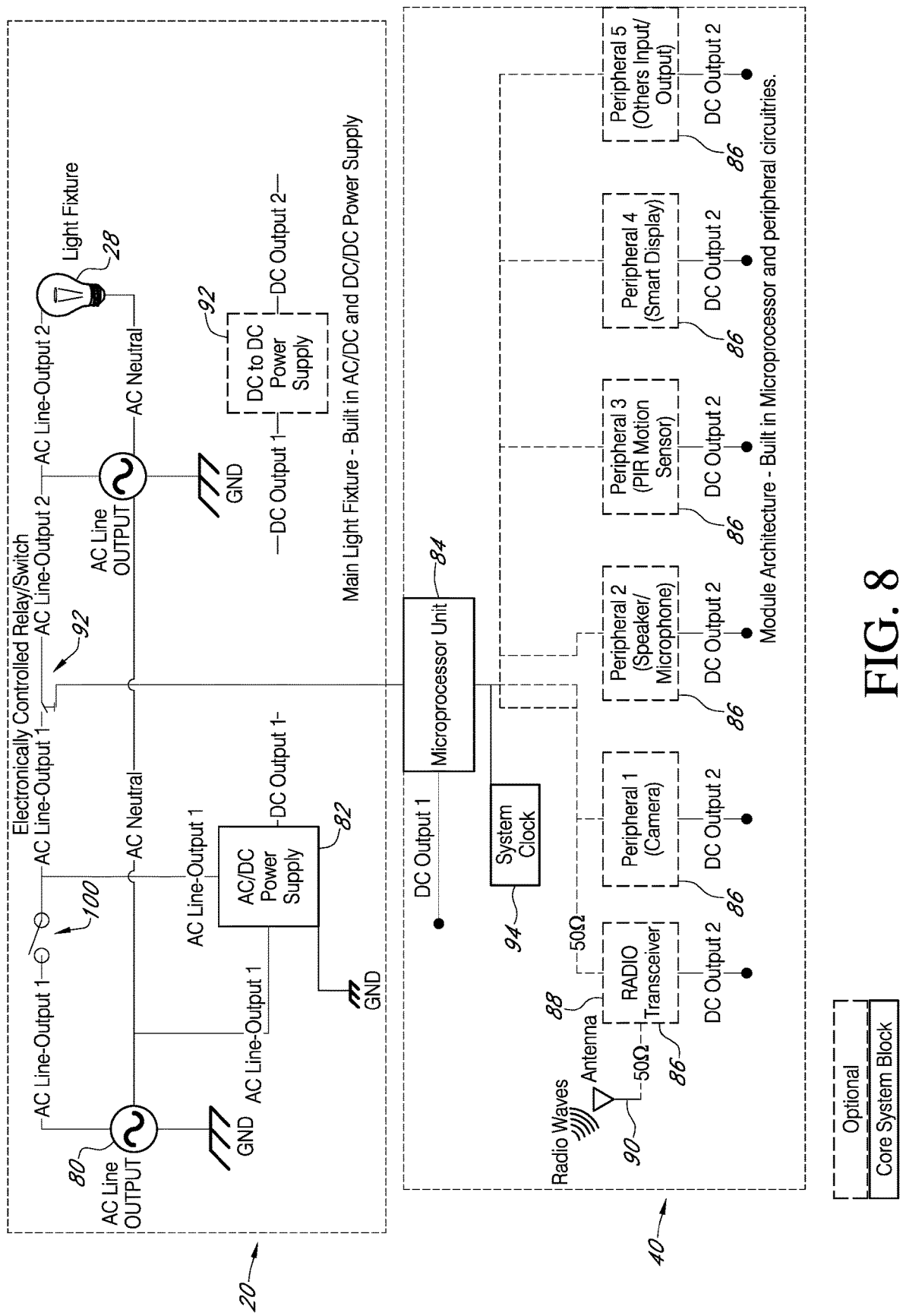
FIG. 8 shows a schematic view of one embodiment of a circuit of a luminaire having a module is attached.

With reference next to FIG. 8, a system block diagram depicts one embodiment of a luminaire's electrical architecture when connected to one or more modules that embed one or more functional structures. In the illustrated embodiment, an AC input power 80, or "wall power", is supplied from the structure to which the luminaire 20 is permanently mounted. Such AC power 80 is connected to an AC/DC power supply 82 that is configured to transform the AC input power to a DC power appropriate for digital devices, notably a microprocessor unit 84 which, in the illustrated embodiment, is connected to one or more of a plurality of peripheral structures 86 in a manner to communicate and supply/regulate power with the peripheral structures 86 and to exchange data 86 with such structures.

In one relatively simple embodiment, the microprocessor unit 84 communicates with a radio transceiver 88 that is coupled with an antenna 90 configured to communicate wirelessly with a remote computer, such as a smartphone. Upon receiving a signal from the smartphone via the antenna 90 and transceiver 88, the microprocessor 84 directs an electromechanical relay switch 92 to open or close in order to control whether power from the AC input power 80 is provided to the lighting element 28. In this manner, with the module 40 attached, the luminaire 20 can be controlled remotely via a smartphone, while such remote control would not have been possible for the luminaire 20 in its original, native configuration. Notably, in such an embodiment the module microprocessor 84 can be operating via a DC current and control switch 92 via a DC signal, which thus controls supply of AC power to the light element 28. It is to be understood that various structures may be used for the switch 92. For example, in another embodiment the switch 92 can comprise a transistor such as a high power transistor that mimics the electromechanical switch electronically (e.g., insulated-gate bipolar transistor "IGBT").

It is to be understood that certain of the components depicted in FIG. 8 can be native to the luminaire 20, and certain of the componentry are added via the module 40. For example, in a preferred embodiment, the microprocessor 84, transceiver 88 and antenna 90 are contained within the module body 44, while the AC power input 80, and even the AC/DC power supply 82 are disposed within the body 22. Of course, the body 22 may have minimal structure, and the AC/DC power supply 82, as well as the relay switch 92 can be disposed within the module 40. Additional embodiments can employ a DC to DC power supply 92 configured to condition power for particular components. Such a power supply 92 can, in some embodiments, be provided in the luminaire body 22, but can also, in additional embodiments, be provided within the module 40.

It is to be further understood that such systems can employ other structure that can help fulfill a particular mission, such as a system clock 94 in communication with the microprocessor 84 and, in some embodiments, one or more peripheral structures 86. In the illustrated embodiment, the peripheral structures 86 represent structures disposed within the module 40 and providing additional functionality, such as a digital camera, wireless communications, PIR sensors, and the like. Modules 40 can have one or more such structures as desired.

In a preferred embodiment, a main switch 100 is provided within the luminaire body 22. Preferably, the main switch 100 is configured to control whether power from the AC Input supply 80 is provided to the body interface 60, from which power can be communicated to a seated module 40. In some embodiments the main switch is a physical switch that is actuated when the switch trigger 50 of a module 40 is received within a switch trigger receiver 52 when the module 40 is installed into the module receiver 30. As such, when the module 40 is connected, the main switch 100 is actuated so that the body interface 60 is powered and actuated. However, when there is no module 40 attached, the main switch 100 remains in a default open state, and the body interface 60 is not powered, and not actuated. Notably, a dummy module 40a, which is received in the module receiver 30 for aesthetic and protection purposes, and not for any electronic function, will not have a switch trigger 50, and thus when the dummy module 40a is received in the receiver 30, the body interface 60 remains unpowered and unactuated.

Figure 9:
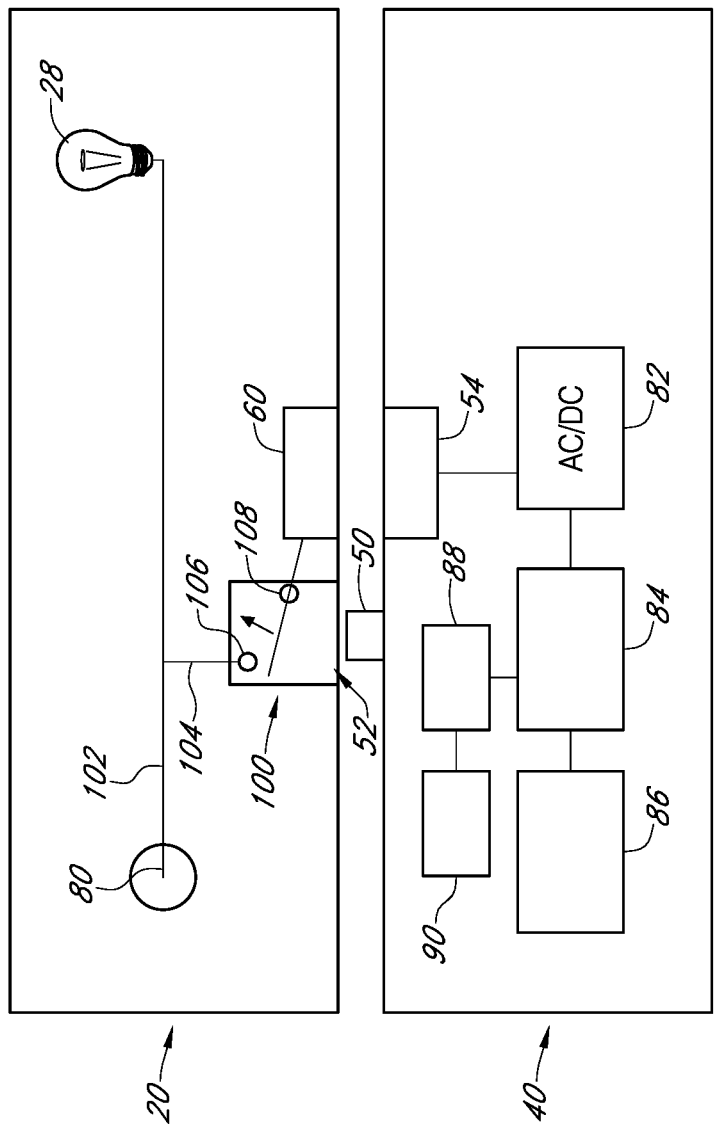
FIG. 9 is a schematic representation of power and control pathways for one embodiment of a luminaire and one embodiment of a module.

With reference next to FIG. 9, a schematic view showing system connections in accordance with one embodiment is depicted. As shown, some system components are disposed within the luminaire body 22, while others are disposed within an attached module 40. As shown, in this embodiment, the AC power input 80 is directly linked via a power line 102 to a light element 28, and the module 40 has no ability to disrupt this link. However, a branch 104 of the power line 102 extends to the main switch 100, terminating at a power input node 106. An interface node 108 in the main switch 100 communicates with the body interface 60. The main switch 100 preferably is biased to an open condition. Thus, when no module 40 is connected, the main switch 100 is open (as shown), and thus the AC power input 80 does not communicate any power to the body interface 60. As such, when a module 40 is removed from a native luminaire 20, no live electrical connector is exposed, even if the native luminaire 20 remains connected to a live power source.

Continuing with reference to FIG. 9, when the switch trigger 50 is received and advanced into the switch trigger receiver 52 as the module 40 is coupled to the luminaire body 22, the switch trigger 50 actuates the main switch 100 so as to put the power input node 106 into communication with the interface node 108. In this manner, AC power from the input 80 is provided to the body interface 60 and further to the module interface 54, which in turn communicates the AC power to the AC/DC power supply 82 disposed in the module 40. The AC/DC power supply 82 transforms the power and communicates conditioned power to the microprocessor unit 84 and other structures such as, in this embodiment, one or more secondary structures 86 and a transceiver 88 and coupled antenna 90. As such, in this embodiment, the module 40 is adapted for wireless communication. Such wireless communication can be, for example, with a remote computer such as a smartphone, with a network such as via a Wi-Fi wireless local area network and/or cellular network, satellite communication, etc.

In the illustrated embodiment, the module 40 has no control effect on operation of the native luminaire 20, and its interaction with the luminaire is limited to the luminaire providing power to the module 40, which performs its own operation(s) otherwise independent of the luminaire 20.

Preferably, the peripheral structure 86 is configured to acquire data and/or act on the data. For example, in one embodiment the peripheral structure 86 can comprise one or more sensors to gather weather-related data such as one or more of temperature, light level, presence of precipitation, and windspeed. Data from the sensor(s) can be relayed to the microprocessor 84, which can save it in a memory, can further process it for communication to a remote computer and can, upon request or in connection with a predetermined procedure, wirelessly communicate it to a remote computer via the transceiver 88 and antenna 90. Peripheral structure 86 of another module embodiment can comprise a battery, a power supply detector, one or more light elements, and a sunlight detector, each of which is controlled by the microprocessor 84. In the case of a power outage, the module will sense the loss of power, determine whether lighting is needed based on sensed light levels, and if necessary, use the battery to illuminate its own light elements. In a still further embodiment, peripheral structure 86 of a module can comprise wireless communication capability combined with a camera and/or speaker and microphone, thus enabling a remote user to view and interact with individuals in range of the module 40. In a still additional embodiment, peripheral structure 86 can also include hardware such as an additional AC plug into which further powered equipment, such as strings of Christmas lights, can be plugged. A peripheral structure 86 further contemplates combinations of functional structures.

The example modules just discussed demonstrate that a broad range of peripheral functionalities can be provided in modules, even when such modules have no substantive effect on native operation of the luminaire 20. Further, a user having a plurality of identical luminaires 20 can fit each luminaire 20 with a module 40 having different peripheral functions, thus obtaining a group of luminaires 20 that look substantially identical but provide a customized suite of different functions.

Figure 9A:
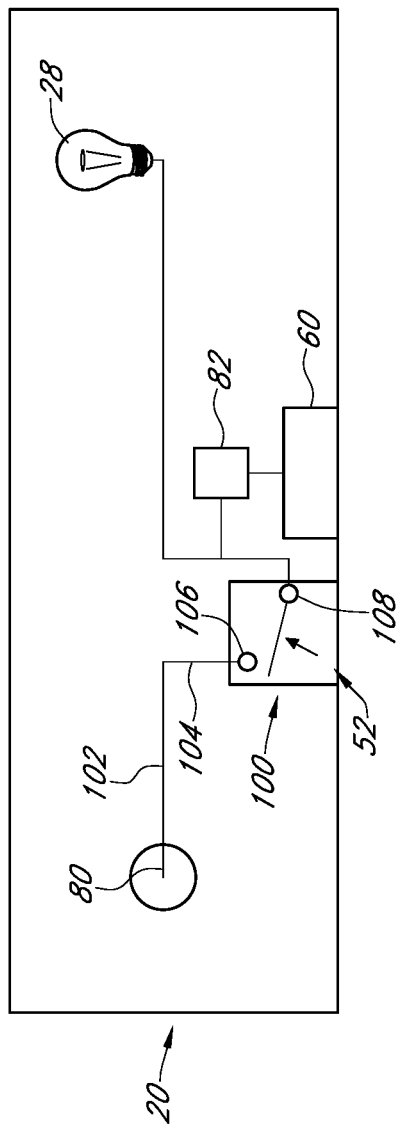
FIG. 9A is a schematic representation of power and control pathways for another embodiment of a luminaire.

With additional reference to FIG. 9A, a schematic view of another embodiment of native circuitry within the luminaire 20 is depicted. In this embodiment, there, is no direct link between the AC power input 80 and the light element 28. Instead, power is routed through the main switch 100, which is biased open in a default condition. As discussed above, when a module 40 is attached, the switch trigger 50 is advanced into the switch trigger receiver 52 so as to actuate the main switch 100. This puts the power input 80 into communication with the light element 28. As such, in this embodiment, the native luminaire 20 is only functional if a module 40 is attached, and such power to the light element 28 is cut off when the module 40 is removed. Preferably, in such an embodiment, a dummy module 40a would include a switch trigger 50 so that connecting the dummy module 40a actuates the luminaire 20.

With continued reference to FIG. 9A, and also FIG. 8, additional embodiments of a native luminaire 20 can include a power conditioner 82 providing any desired conditioning, such as AC/DC and/or AC/AC, within the native luminaire circuitry. As such, the module 40 may be configured without a conditioner of its own, or perhaps, in some embodiments, with a DC/DC power conditioner. In some embodiments, the native luminaire 20 can be configured to connect multiple types of power (i.e., AC or DC at a particular voltage) to different connectors within the body interface 60. The module interface 54 can be configured to connect to both of these power supplies and direct them to different components, or configured to only connect to a desired one of the power supplies, with some modules configured to connect to one, and some modules configured to connect to the other.

Figure 10:
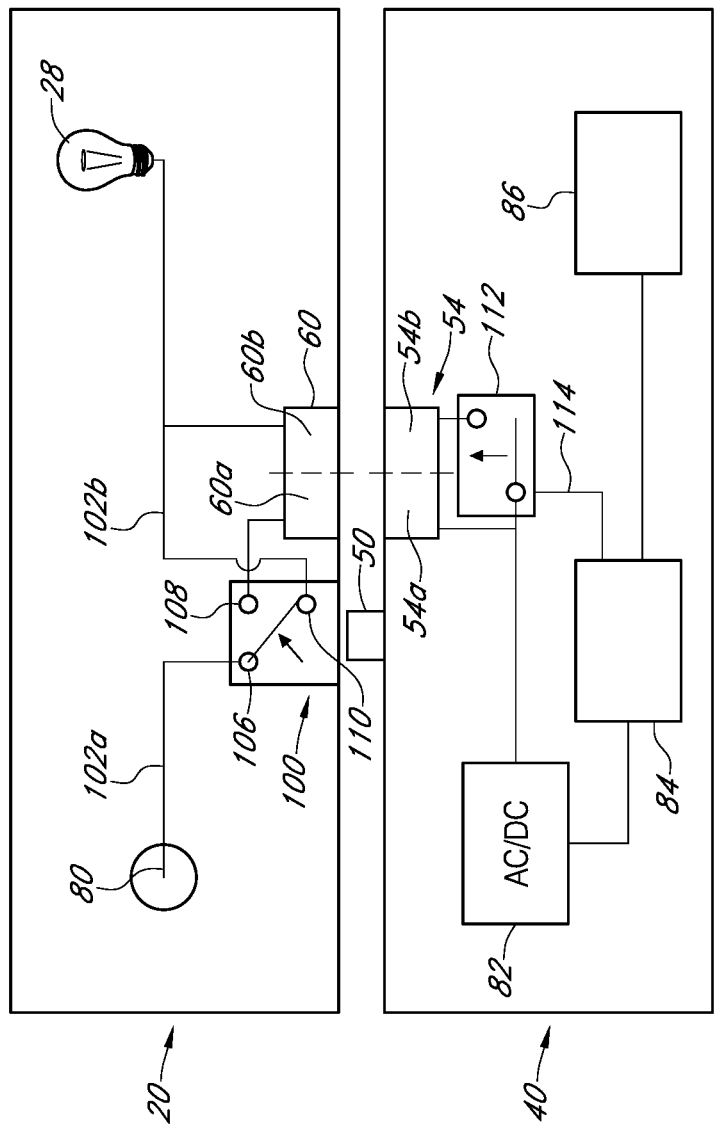
FIG. 10 is a schematic representation of power and control pathways for another embodiment of a luminaire and another embodiment of a module.

With reference next to FIG. 10, a schematic view showing system connections of another embodiment is depicted. In this embodiment, the native circuitry within the luminaire 20 is configured not only to power a connected module 40, but also to enable the module 40 to control operation of the luminaire 20. As shown, AC input power 80 is not uninterruptibly connected to the lighting element 28. Rather, such power is communicated via power line 102a to a power input node 106 at the main switch 100. A power output node 110 at the switch 100 communicates with the lighting element 28 via power line 102b. Preferably, the switch 100 is biased closed between the power input node 105 and output node 110 so that the natural disposition (i.e., without a module attached) of the luminaire 20 is for AC power 80 to be supplied from input 80 to the lighting element 28 via the main switch 100. The main switch also includes interface node 108, which communicates with body interface 60. With the main switch 100 in the native position, the interface node 108 is unconnected, and no power is communicated to the interface 60.

With continued reference to FIG. 10, when the module 40 is attached to the module receiver 30, the module pin 50 actuates the main switch 100, disconnecting the input node 106 from the output node 110 and connecting the input node 106 to the interface node 108 so that the body interface 60 is energized. As shown, AC power is delivered from the body interface 60 to the module interface 54, from which it is communicated to an AC/DC power supply 82 of the module 40, which transforms the AC input power to a DC power suitable for the microprocessor unit 84 and one or more peripheral structures 86. In some embodiments the module 40 may include a DC to DC power supply dedicated to conditioning power for certain structures as necessary.

In the illustrated embodiment, the body interface 60 includes a power input portion 60a configured to deliver power to a power input portion 54a of the module interface 54, and a power output portion 60b configured to receive an output power from a power output portion 54b of the module interface 54. As shown, a relay switch 112 is interposed between the power input and output portions 54a, 54b of the module interface 54. The relay switch 112 preferably is controlled by the microprocessor unit 84 via a power control line 114. When the microprocessor unit 84 directs the relay switch 112 to close, AC power is directed to the power line 102b so as to energize the lighting element 28. As such, in this embodiment, when no module is attached, the native luminaire 20 is directly connected to power the lighting element 28. However, when the module 40 is attached, control of power delivery becomes controlled by the module 40.

Continuing with reference to FIG. 10, embodiments having this configuration can accommodate a plurality of different types and configurations of modules 40. For example, in one embodiment, the peripheral structure 86 of the module 40 includes wireless communication structure so that the luminaire 20 can be controlled via a remote computer such as a smartphone. In additional embodiments the peripheral structure 86 can comprise, for example, passive infrared (PIR) sensors, and the processing unit 84 can be configured to turn on the light when, for example, the PIR senses movement and/or detects reduced sunlight indicating that dusk has arrived and the light should be on for the night. Of course, the peripheral structure 86 can include a plurality of functional structures such as including PIR sensors, cameras, microphone and speaker, and wireless communication structures. Further, the processor unit 84 can be configured with a memory. For example, the processor unit 84 may have a plurality of control routines stored thereon, and may be configured to selected and run certain automated control routines in response to PIR sensor inputs, which control can be over overridden by a remote computer, which can also be used to customize control routines and/or upload additional control routines.

In some embodiments, the module peripheral structure 86 can include still additional functional structure, such as a camera that is configured to begin recording video in response to PIR sensor inputs, and such video and associated notifications can be communicated via wireless communication structure to the remote computer. It is to be understood, of course, that further functional structure, both functional structure presently known and yet to be discovered or invented, can be incorporated into modules 40 to add smart functionality. p Further, it is to be understood that embodiments need not be limited to the specific structure and electronic connections depicted in the drawings. For example, in another embodiment having similarities to the embodiment depicted in FIG. 10, the peripheral structure 86 can include a battery, and the module will also comprise a power supply detector. In the case of a power outage the battery will supply power to the lighting element 28. In such an embodiment, the peripheral structure 86 may also include a DC/AC power conditioner, and an electrical connection directly to switch 112 so that the battery can supply AC power to and through switch 112 to the lighting element 28 when so directed. Preferably, such battery can also have a DC output configured to power other components in the module, such as the module processor 84, a transceiver, sensor(s) or the like.

In the embodiments discussed in connection with FIGS. 9 and 10, the native configuration of the luminaire 20 has been relatively simple, comprising simple on/off power supply to the lighting element 28. In short, the native luminaires 20 of FIGS. 9 and 10 are "dumb" fixtures with no processing power or functionality. The native luminaire 20 of FIG. 10 can be made "smart" with the addition of a module 40 with digital processing ability. In additional embodiments, the native luminaire 20 can itself be "smart", having a level of processing power of its own, but addition of a module 40 can enhance and/or override the native luminaire's own processing ability and functionality.

Figure 11:
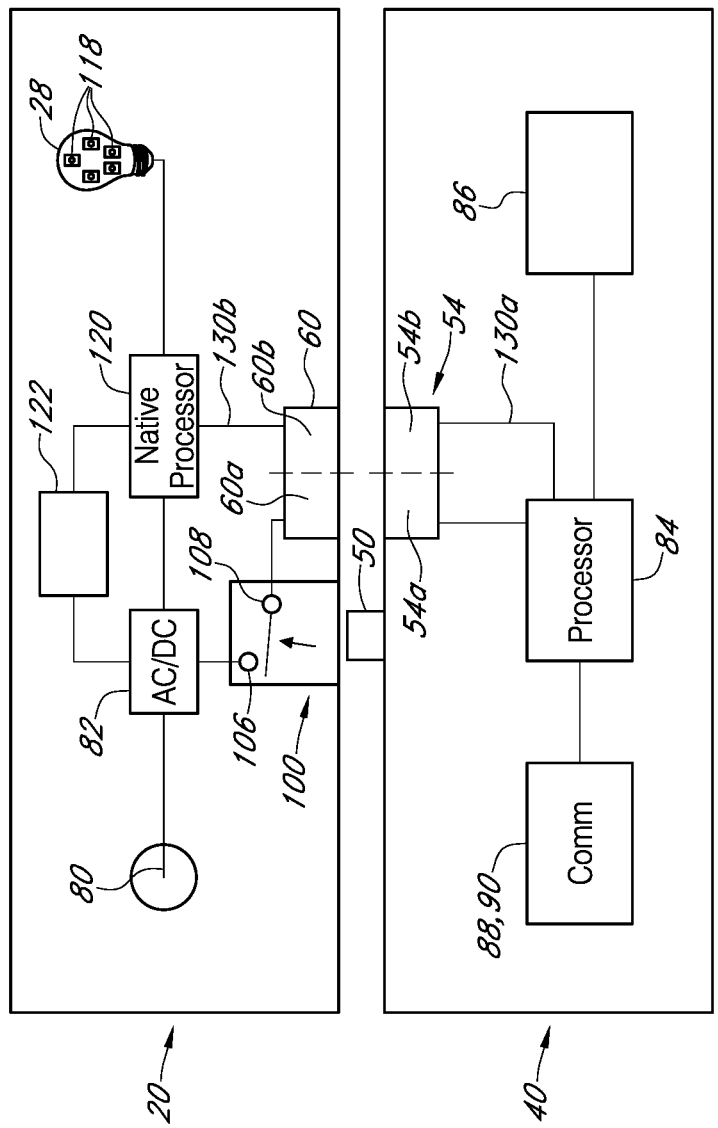
FIG. 11 is a schematic representation of power and control pathways for yet another embodiment of a luminaire and yet another embodiment of a module.

With reference next to FIG. 11, a schematic view showing system connections of yet another embodiment is depicted. In this embodiment, the lighting element 28 comprises a plurality of LEDs 118, preferably configured to enable variations of light output depending on a control strategy. For example, as known in the art, an array of LEDs having various colors of LEDs 118 can be controlled so as to determine factors such as brightness and color temperature of the lighting element 28. In some configurations, such as with RGB arrays, LEDs can be controlled so that the output of the lighting element 28 can be quickly changed to alternate between differing colors.

In the illustrated embodiment, the native luminaire 20 includes the AC input power 80 received from the structure to which the luminaire 20 is permanently mounted. The AC input power preferably is transformed by an AC/DC power supply 82. A native microprocessor unit 120 is provided, and includes data processing ability to control operation of the LEDs 118 of the lighting element 28 according to one or more control routines saved within a memory of the native unit 120. A native peripheral structure 122 is configured to gather data and provide such data to the native microprocessor unit 120 for the unit 120 to consider when determining how to control the lighting element 28. For example, in one embodiment the native peripheral structure 122 comprises one or more PIR or other sensors configured to determine daylight levels and/or detect movement. Upon receiving such data, the native microprocessor unit 120 may determine whether to provide power (and determine a level of power to provide) to the lighting element 28.

With continued reference to FIG. 11, DC power is provided to a power input node 106 in the main switch 100. An interface power node 108 of the main switch 100 communicates with the body interface 60. The native position of the switch 100 is for the switch to be open so that no power is delivered to the interface 60. When the module 40 is coupled to the luminaire 20, the switch pin 50 actuates the main switch 100 so as to connect the power input node 106 and interface power node 108 so that power is provided through interface 60 to the module interface 54, from which it is delivered to the module's microprocessor unit 84. In the illustrated embodiment, the module 40 includes peripheral structure(s) 86, including a communication structure having, for example, a transceiver 88 and antenna 90.

The module microprocessor unit 84 communicates data to and from the native microprocessor unit 120 via a communication line 130*a*, 130*b* through the engaged interfaces 54, 60. As such, the module microprocessor 84 can both communicate data and instructions to the native microprocessor 120 and receive data therefrom. For example, sensor data generated by native peripheral structure 122 and received by the native processor 120 can be communicated to the module processor 84. The module processor 84 can consider such data, in addition to data obtained from the peripheral structures 86, in determining an LED control routine, which is communicated to the native processor 120 for further communication to the lighting element 28. In such an embodiment, the module processor 84 assumes a superior/control role, disabling the native processor's control role, but still considering saved data, saved routines and the like of the native processor 120.

As an example, in one embodiment, PIR sensor data obtained by native peripheral structure 122 and passed by the native processor 120 to the module processor 84, is considered by the module processor 84 to select one of the routines saved at the native microprocessor unit 120. Such data is also communicated by the module processor unit 84 to a remote computer via the communications structure 88, 90. A remote computer can then interact with the module microprocessor 84 to alter the saved routines of the native processor unit 120. In further embodiments, a remote computer can create and/or otherwise obtain desired control routines, and upload such control routines to the module processor unit 84 to be saved in a memory of the module processor unit 84 and/or native processor unit 120, and selected for current use or saved for later use.

In some embodiments, the peripheral structure 86 can include, in connection with other peripheral structures, a battery. The module 40 can also be configured to detect when the module 40 is removed from the native luminaire 20—such as via a sensor and/or monitoring communication between the module microprocessor 84 and native processor 120. When the module 40 is removed, the battery will power components of the module, and the processor 84 will be triggered to send a notice via a wireless transceiver to a remote computer.

In a still further embodiment, the peripheral structure 86 can include, for example, a screen for displaying certain information, such as temperature. The peripheral structure 86 can also include sensor(s) for obtaining data from which the microprocessor unit 84 can determine the temperature. However, before directing the peripheral structure 86 to display the temperature on the screen, the module processor 84 obtains light level data from the native peripheral structure 122 via the native processor unit 122 to decide how bright the display should be. Such a screen could also be configured as a touch screen that can accept user inputs for communication to the processors 120, 84.

In still further embodiments, the peripheral structure 86 can include, for example, a speaker and microphone, and the communications structure and module microprocessor unit 84 can be configured to receive music streamed from a remote computer and to play the music on the speakers. In an embodiment in which the lighting element 28 comprises an array of RGB-style LEDs 118, the microprocessor unit 84 can also be configured to direct control of the LEDs 118 to flash and display changing colors in a manner that cooperates with the music simultaneously being played by the speakers.

It is to be understood, then, that in embodiments in which the native luminaire 20 includes some "smart" processing capability, embodiments of modules 40 can be coupled to the luminaire 20, and data can be exchanged between processors of both the native luminaire 20 and the module 40 in order to enhance the native capabilities of the luminaire 20.

In the embodiment illustrated in FIG. 11, interfaces 54, 60 are schematically depicted as configured to interface both power (54a, 60a) and data (54b, 60b). It is to be understood that this is solely a schematic representation, and that in some embodiments, each interface will actually comprise multiple separate structures, such as a power interface specifically configured to communicate AC and/or DC power, and a data interface specifically configured to communicate data (and some DC power), such as a USB-type interface or other standardized interface.

It is to be understood that some control structures require very low DC power levels. In some embodiments in which AC input power is converted to low-voltage DC power within the luminaire 20, a designer may choose not to include a main switch, but instead to allow the body interface to remain energized.

With reference again to FIGS. 9-11, depending on the configuration of the native luminaire 20, some embodiments of modules will not be fully compatible with some native luminaires. For example, the native luminaire 20 of FIG. 9 does not enable an attached module 40 to exercise any control over functionality of the luminaire 20. As such, a module configured as in the FIG. 11 embodiment would not be able to fully function with a native luminaire 20 configured as in the FIG. 9 embodiment. As such, in still another embodiment, a system of modules 40 and luminaires 20 can be provided in which only compatible modules 40 may be physically coupled with a particular native luminaire 20. In one such embodiment, native luminaires configured such as depicted in FIG. 9 can have coupling structure as depicted in FIGS. 1-6, while native luminaires configured as depicted in FIG. 10 will be configured with the guides 70 shifted a short distance transverse to the location as depicted in FIGS. 1-6, and native luminaires configured as depicted in FIG. 11 will be configured with the guides 70 shifted still further transversely. Modules compatible with respective ones of such native luminaires will have their guide slots 72 shifted correspondingly. As such, the electromechanical couplings will be configured so that only modules that are compatible with a particular native luminaire can be fitted with that luminaire, as the coupling structure will physically block coupling of incompatible modules and native luminaires. Of course, although the position of the guides and guide slots is presented in this embodiment, it is to be understood that any desired physical block structure—such as a pin on one or the other of a native luminaire and module sized, configured, and positioned to be received in a receiver formed on the other of only a compatible module or native luminaire—can be employed.

Figure 12:
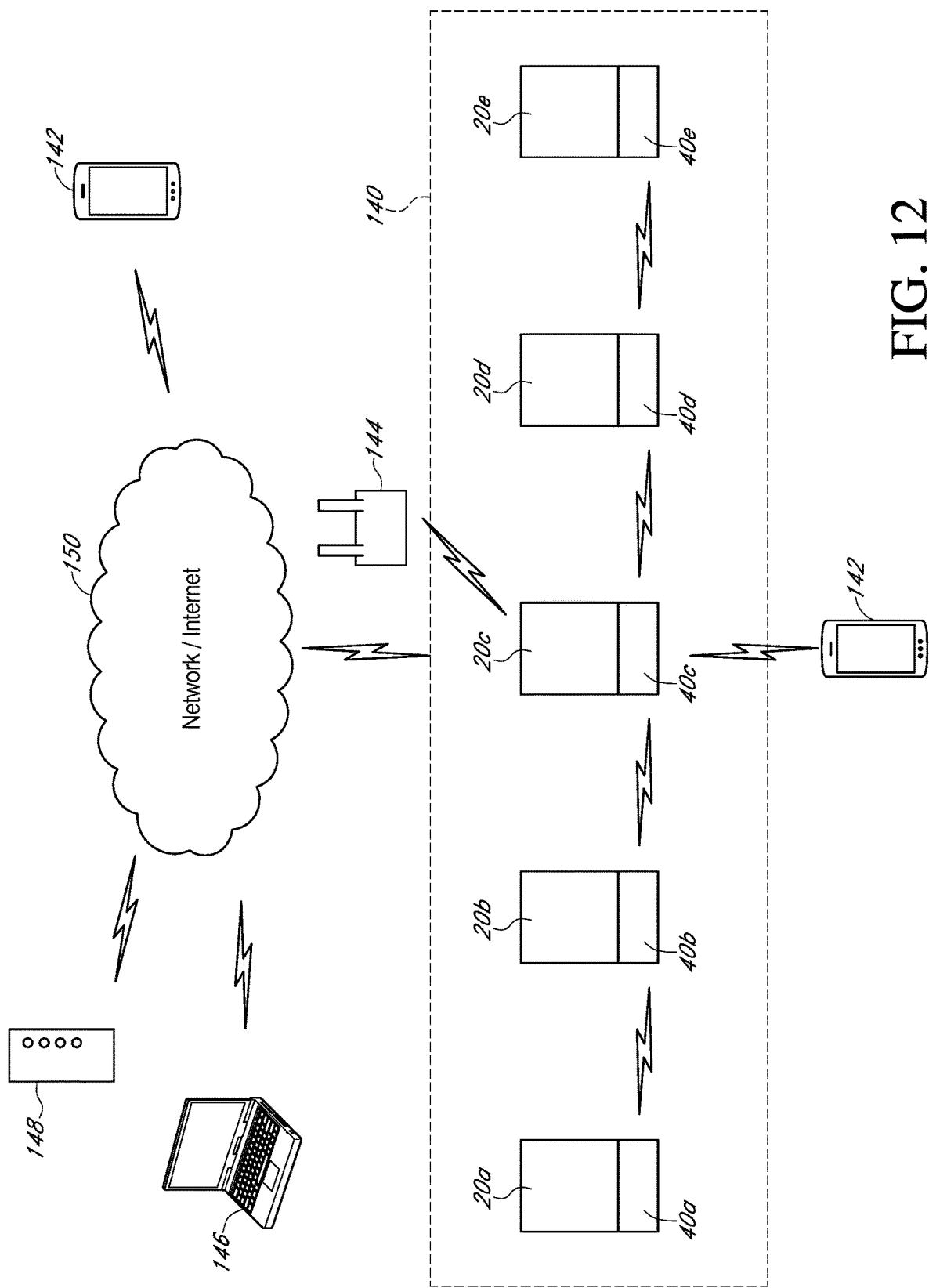
FIG. 12 is a schematic representation of a plurality of luminaires, each having a module, in which the modules enable the luminaires to work as a group.

With reference next to FIG. 12, in accordance with one embodiment, by employing principles discussed herein, a plurality of otherwise identical native luminaires 20a-e can be grouped together so as to work in concert when combined with corresponding modules 40a-e. For example, in the illustrated embodiment, a group 140 of native luminaires 20a-e are each identical native luminaires 20 permanently mounted to a structure—such as a long commercial hallway in an example embodiment. The modules 40a-e mounted to corresponding luminaires 20a-e have different peripheral structures, but are configured to work together. For example, each of the modules 40a-e includes a short range communications structure that enables each module to communicate with the adjacent module. Only the center module 40c includes a more powerful communications structure, enabling wireless communication with, for example, a remote computing device such as a smartphone 142, a WiFi router 144 through which it communicates with the internet and/or a network such as a cellular network. The communications structure can also be configured to communicate directly with the internet and/or network. Thus, the module 40c can communicate via the internet and/or network with remote computing devices such as a smartphone 142, computer 146, server 148 or the like. Data collected by all the modules 40a-e can thus be communicated to the communications module 40c and further communicated to the remote computing device, and control instructions provided by the remote computing device to the communications module 40c can be further communicated to the rest of the modules 40a, 40b, 40d, 40e. Thus, remote control of the entire group of luminaires 20a-e can be effected.

With continued reference to FIG. 12, configuring the modules 40a-e with differing peripheral structures can further help the luminaires 20a-e work as a group 140. For example, in another embodiment, modules 40a and 40e are fitted with motion-detecting sensors. When either module 40a or 40e detects motion, such detection is communicated to all of the modules 40a-e, and the entire group of luminaires 20a-e is directed to illuminate for a period of time generally corresponding to the time it take for a person to walk along the hallway where the group 140 of luminaires 20 is mounted. Additionally, in some embodiments one of the modules, such as module 40b, can be configured with one or more cameras directed in different orientations. Upon communication of a detected motion by modules 40a or 40e, the cameras of 40b are prompted to take video, which video is either saved in a memory of module 40b and/or communicated to communications module 40c for communication to an online location to be saved in memory and/or for communication along with a notification and video streaming to a security station.

With continued reference still to FIG. 12, in yet another embodiment, module 40d can be configured with a microphone and speaker, as well as an emergency-indicating light, such as a downwardly-directed moving red light incorporated into the module body 42. As such, when an emergency is indicated, such as by being communicated to the communication module 40c by a remote device and then to the emergency module 40d, the emergency light can be actuated, and instructions communicated via the speaker.

The embodiment and discussion in connection with FIG. 12 demonstrates that a plurality of identical luminaires 20a-e which, of themselves, may have very limited function, can be transformed into a group of luminaires 20 that work together to achieve certain functions due to coupling with corresponding modules 40a-e that each may have a different peripheral structure and function, but nonetheless can work together and share both data and control instructions for a common purpose.

In the illustrated embodiments, the luminaire 20 has been depicted as having a single module receiver 30 and being coupled with a single module 40. It is to be understood that, in additional embodiments, a luminaire 20 may have a plurality of module receivers 30 and may be configured to receive a plurality of modules 40. For example, a group of identical street light luminaires may have a top module receiver that is optimal for some types of modules—such as those sensing daylight or precipitation conditions or having satellite communications hardware—and a bottom module receiver that is optimal for other types of modules, such as for cameras or for detection of motion on a corresponding sidewalk. Additionally, it is to be understood that some embodiments of modules may themselves have module receivers 30 configured to receive yet another module 40, and that the attached modules can share power and data with one another consistent with embodiments discussed herein. Thus, multiple modules can be attached to a native luminaire.

In the embodiments discussed above in connection with FIGS. 1-12, a module 40 is connectable to a native luminaire 20 via a module receiver 30 disposed in a luminaire base 24. In additional embodiments a module can be electrically connected to a native luminaire 20 without being physically supported by the native luminaire 20. In such embodiments, the native luminaire 20 may have no structure for physically supporting the module 40.

Figure 13:
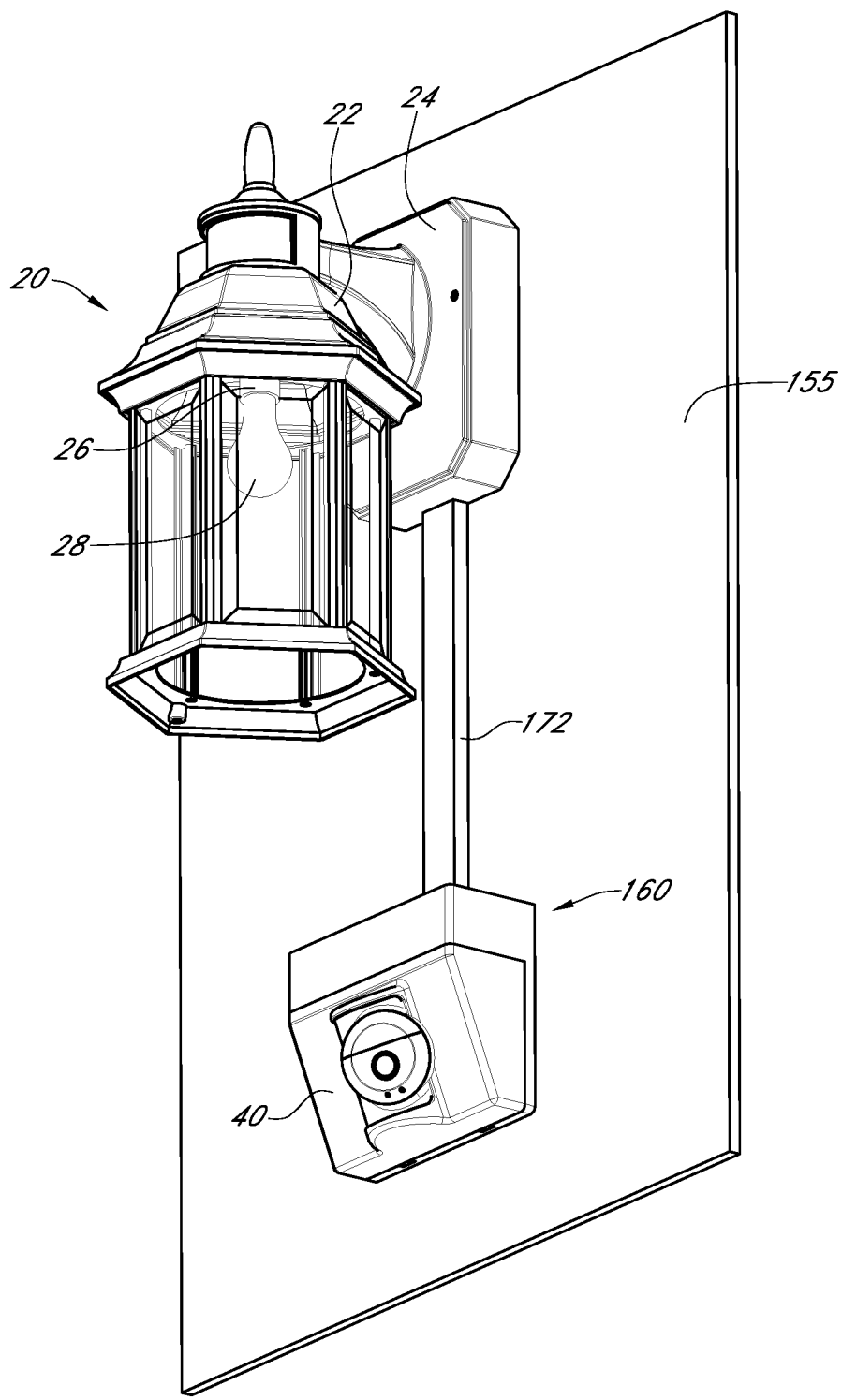
FIG. 13 is a perspective view of an embodiment of a luminaire system configured to receive a module.
Figure 14:
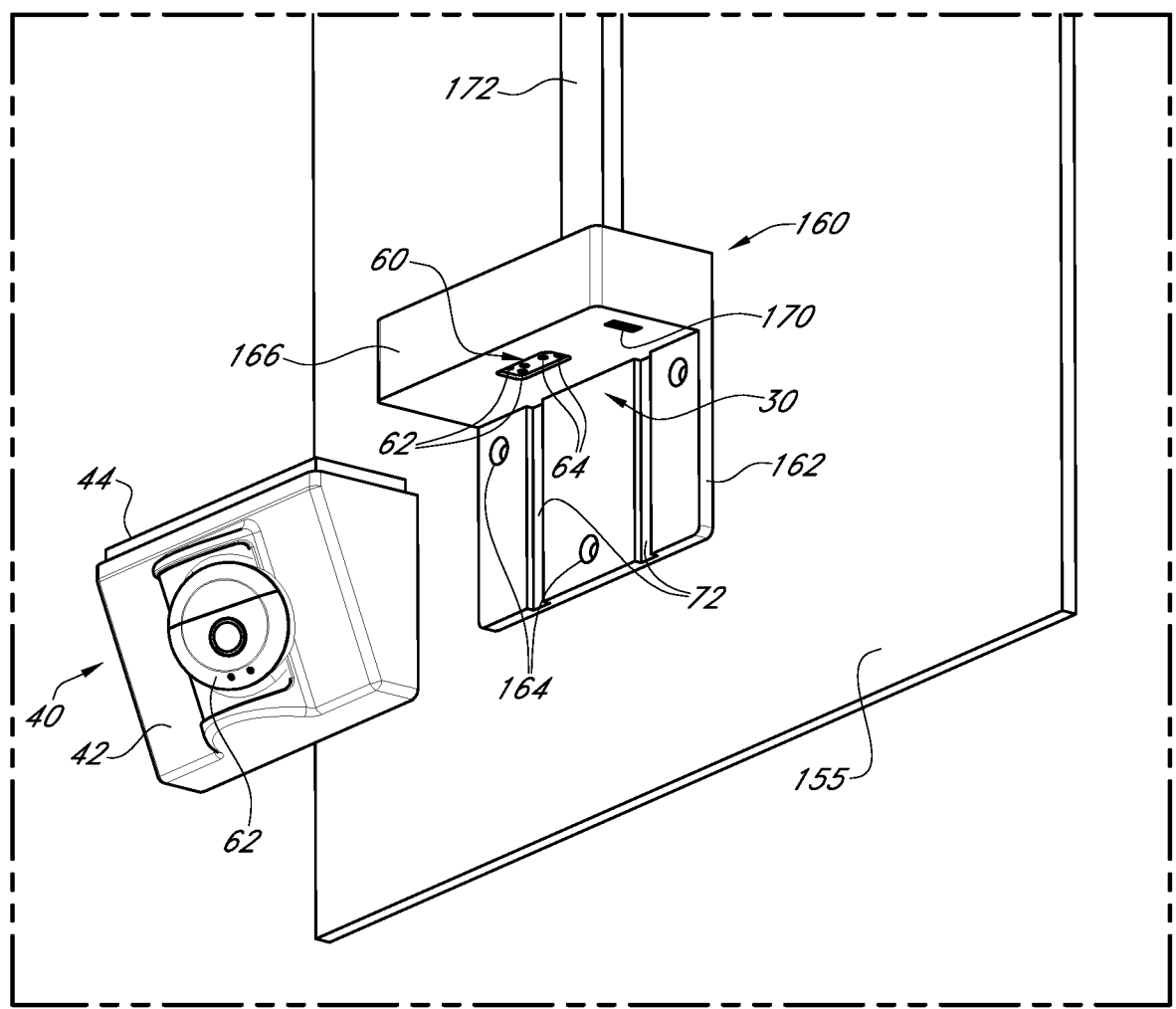
FIG. 14 is a close-up view of the arrangement of FIG. 13 showing a module detached from a module base.
Figure 15:
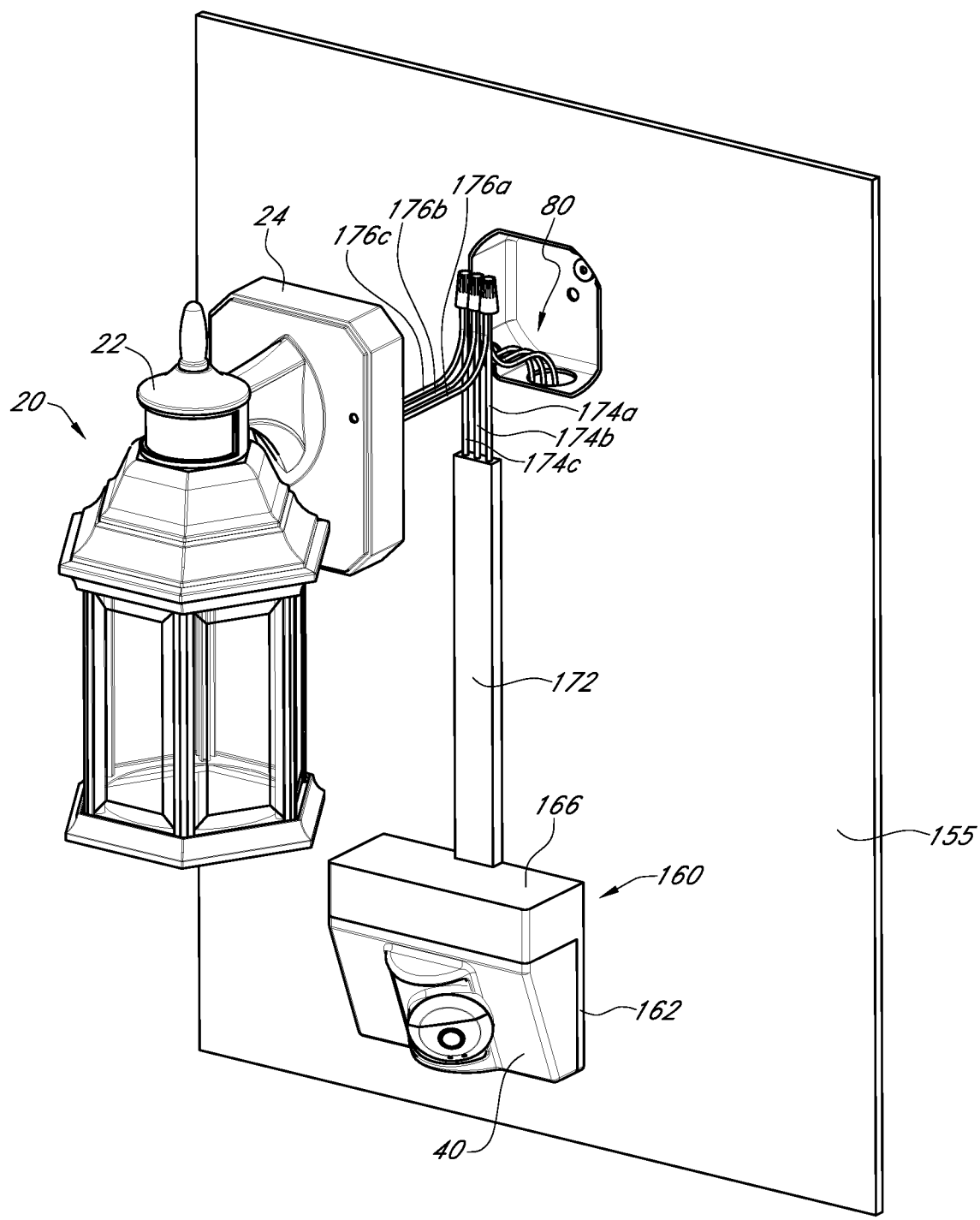
FIG. 15 is a perspective, partially-disassembled view of an embodiment of a luminaire system.

With reference next to FIGS. 13-15, a native luminaire 20 has a fixture body 22 and includes a light mount 26 configured to support a lighting element 28. A luminaire base 24 supports the fixture body 22 and is configured to be permanently mounted to a permanent structure, such as a wall 155 of a residence, commercial building or the like. The illustrated native luminaire 20 does not include structure for mounting a module 40 thereon. A module base 160 is formed separately from the native luminaire 20, and comprises an attachment plate portion 162 and a module base housing portion 166. The attachment plate portion 162 comprises a plurality of fastener holes 164 configured to accept fasteners therethrough in order to securely, and permanently, connect the module base 160 to the wall 155. In the illustrated embodiment, the base housing portion 166 encloses a space therewithin.

With specific reference to FIG. 14, the module base 160 preferably defines a module receiver 30 configured to releasably receive the module 40 therein. The module receiver 30 can have structure resembling that described in previous embodiments, but it is to be understood that various specific structures for a module receiver 30 and a module coupler portion 44 are anticipated. In the illustrated embodiment, the module receiver 30 includes a body interface 60 having a first group 62 and a second group 64 of pin receivers configured to interact with first and second groups 56, 58, respectively, of pins on a module interface 54 of the module 40 (see FIG. 5).

In the illustrated embodiment, a secondary interface 170 is provided in the module receiver 30. The secondary interface 170 can include an interface for electronic control signals, such as a USB, mini-USB or any other interface configured to communicate electronic signals therethrough and power an external device such as a camera, or an additional or alternative connection to the module 40, which can have a mating interface. In the illustrated embodiment, guide slots 72 are provided on the attachment plate portion 162, and complementarily-shaped guides (not shown) can be formed on the module body 42. The module 40 can be attached to the module base 160 by aligning the guides with the guide slots 162 and sliding the module 40 upwardly so that the module interface 54 aligns with and engages the body interface 60. The module 40 can be selectively held in place by fasteners, clips, or any desired structure.

In the illustrated embodiment a switch trigger receiver 52 is not shown. It is to be understood that, in some embodiments, a switch trigger receiver 52 can be included, or the secondary interface 170 can in fact be a switch trigger receiver. Similarly, the illustrated embodiment may or may not have a switch trigger 50. A main switch 100 can be included in the base housing 166, instead of being within the base 24 of the luminaire 20, as is depicted in some of the embodiments discussed above. Further embodiments, however, may not include a main switch, and/or the main switch can be closed in its native position.

Continuing with reference to FIGS. 13-15, in the illustrated embodiment the module base 160 is mounted to the wall 155 independent of and spaced from the luminaire 20. Preferably one or the other of the luminaire 20 and module base 160 are mounted to the wall 155 so as to be aligned with the wall power/AC input power 80. A conduit 172 may be configured to run from a source of input power 80 to the module base 160. As shown in FIGS. 13 and 15, in the illustrated embodiment the luminaire 20 is mounted to the wall 155 so that the luminaire base 24 is aligned with the AC input power 80, the module base 160 is spaced from the luminaire, and the conduit 172 runs from the input power 80 to the module base 160.

With additional reference to FIG. 15, in one embodiment, input power 80 comprises a 3-wire AC configuration that connects to a module power cable 174 having positive, negative and ground module power wires 174a, b, c. As such, input power 80 is delivered through the conduit 172 into the space within the base housing 166, and such power is communicated to the module 40 via, for example, the aligned interfaces 54, 60, as discussed in previous embodiments. In the illustrated embodiment, input power 80 also connects directly to a luminaire power cable 176 also having positive, negative and ground luminaire power wires 176a, b, c. As such, in this embodiment the luminaire 20 and module 40 are both powered directly by the input power 80 and independently of one another. This embodiment can resemble a configuration as discussed in connection with FIG. 9, but in which the body interface 60 is disposed within the module base housing 166. It is to be understood that, in additional embodiments, power conditioning structures, such as an AC/DC power supply 82, can be supported within the base housing 166 and electrically interposed between the input power 80 and body interface 60. As such, this embodiment can also support configurations as discussed in connection with FIG. 9A.

In embodiments as discussed in connection FIG. 15, the luminaire 20 and module 40 can operate substantially independently of one another. Further, the luminaire 20 can in fact be a "dumb" luminaire having little or no processing capacity of its own. It is to be understood, however, that, in some embodiments, and as in some embodiments discussed above the luminaire 20 can also be a "smart" luminaire including structure configured to assist in control of the luminaire such as, for example, a light sensor and dimmer, electronic communications structure or the like.

Figure 16:
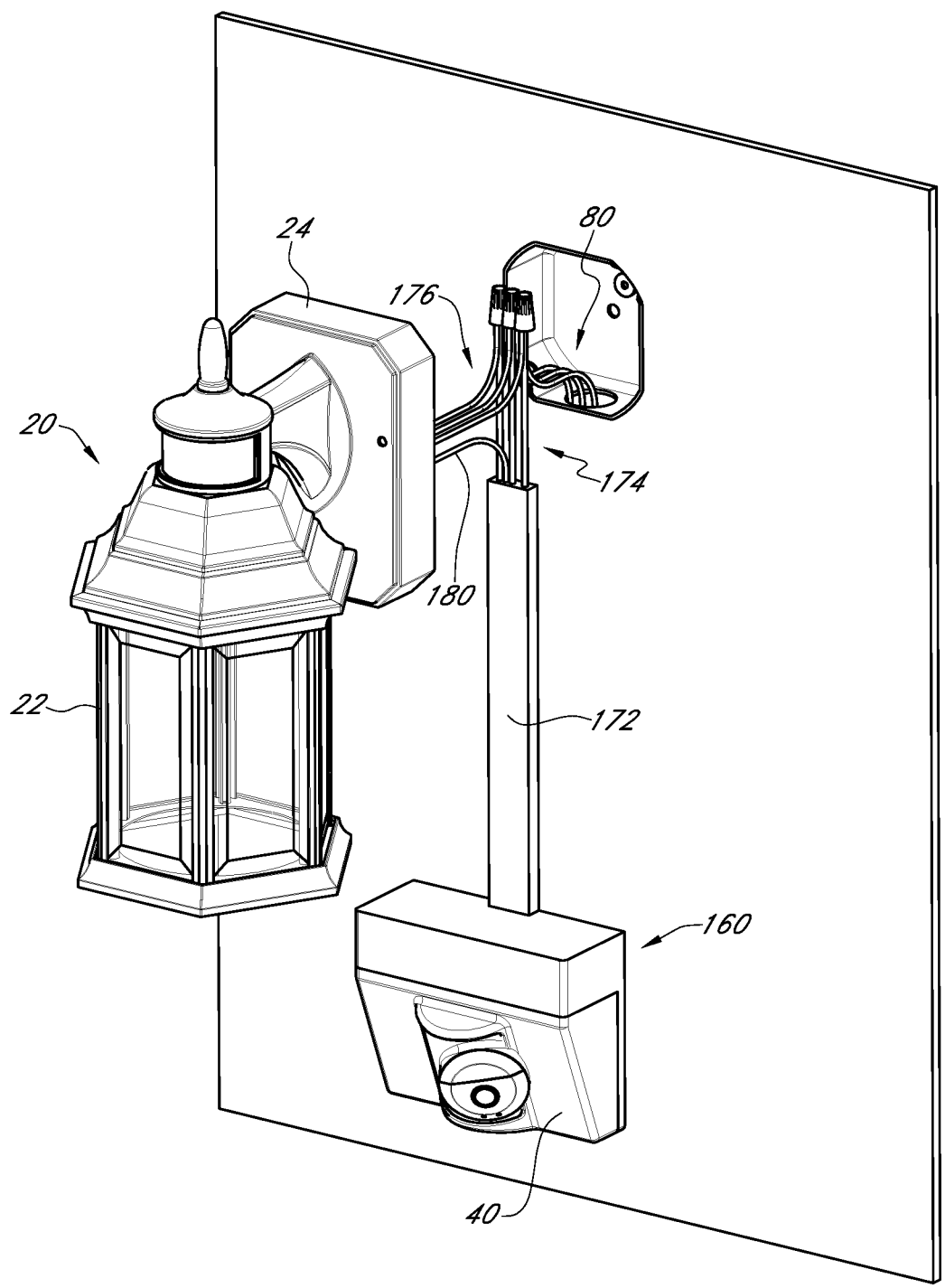
FIG. 16 is a perspective, partially-disassembled view of another embodiment of a luminaire system.

With reference next to FIG. 16, in another embodiment, a smart luminaire 20 can be configured to receive an external input, such as via a control interface (not shown). The module 40 can be configured to output control signals to a communication line 180, which extends through the conduit 172 and can be connected to the smart luminaire 20 to provide data interface, control signals, or the like. Such structure can support embodiments similar to those discussed above in connection with FIG. 11, in which the smart luminaire 20 includes its own native processor 120 with which the module 40 can communicate via a communication line 130b. Preferably, however, the body interface 60 is disposed within the base housing 166.

Figure 17:
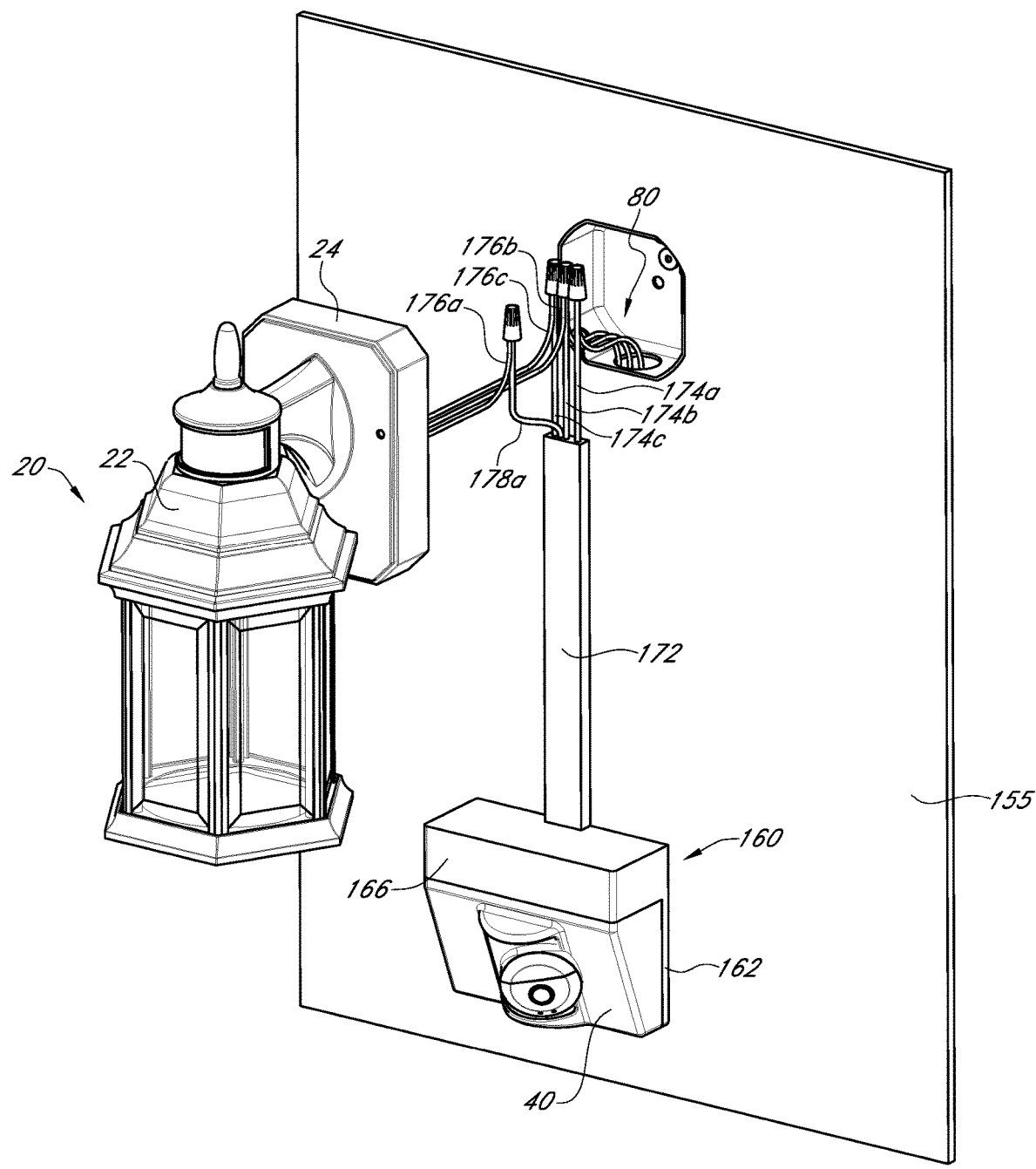
FIG. 17 is a perspective, partially-disassembled view of still another embodiment of a luminaire system.

With reference next to FIG. 17, in another embodiment the luminaire 20 is connected to the AC input power 80 in a manner so that the power delivery path passes through the module 40, and thus the module 40 can control whether power is delivered to the luminaire 20. In the illustrated embodiment the luminaire and module negative power wires 176b, 174b and luminaire and module ground wires 176c, 174c are connected directly to AC input power 80, but only the module positive power wire 174a is connected directly to AC input power 80. A module positive output wire 178a connects to the luminaire positive power wire 176a, and the module connects to the module positive output wire 178a via the body interface 60. Such an arrangement will support embodiments similar to those discussed above in connection with FIG. 10. In such embodiments, control of power delivery to the luminaire 20 is accomplished within the module 40.

Figure 18:
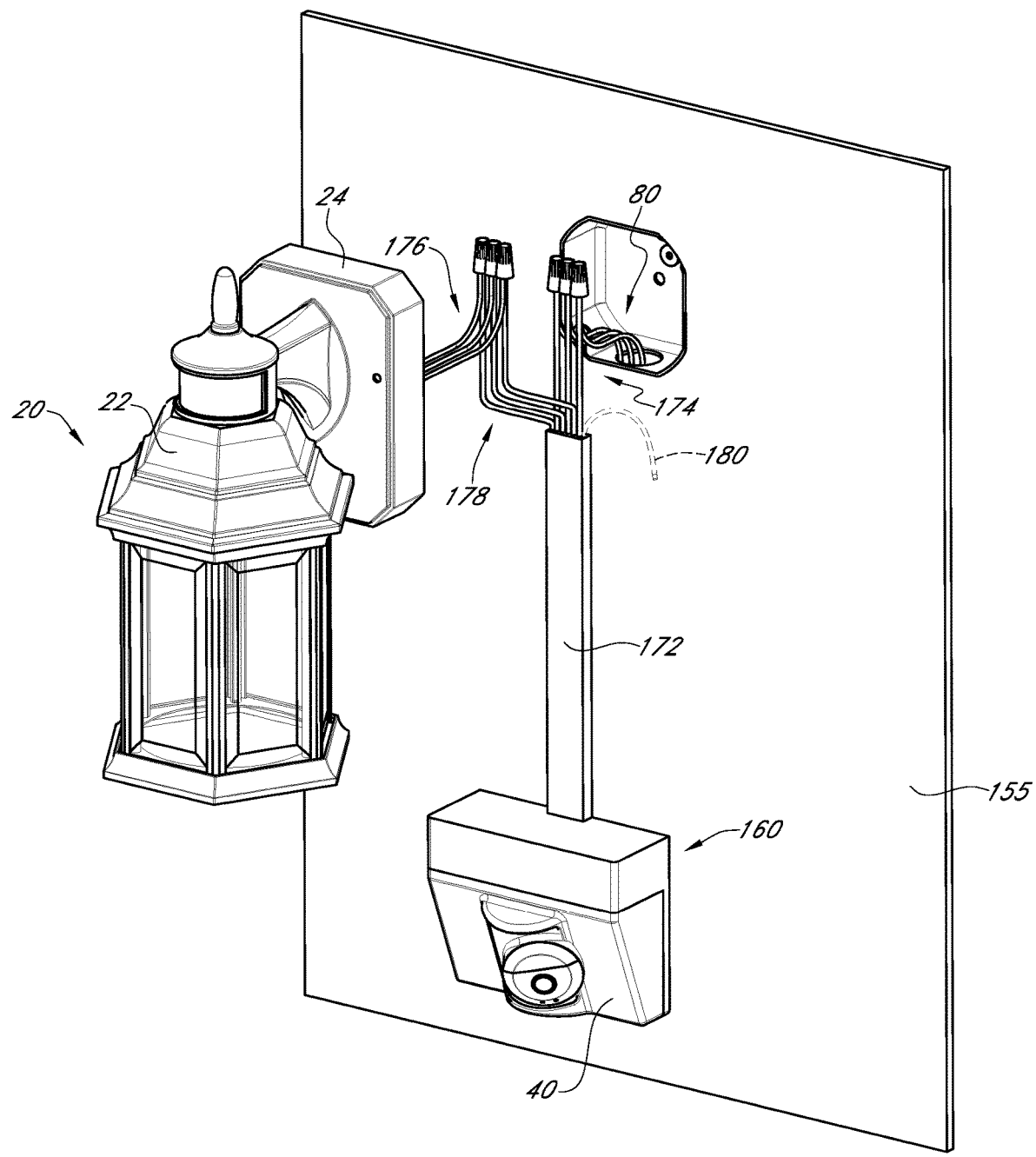
FIG. 18 is a perspective, partially-disassembled view of yet another embodiment of a luminaire system.

With reference next to FIG. 18, in another embodiment, the module base 166 can be provided as a kit and includes module power cable 174, which is configured to attach to the AC input power 80, and a module power output cable 178 which is configured to attach to the luminaire power cable 176. The luminaire power cable 176 is not directly connected to the AC input power 80. The module power cable 174 extends to the base housing 166, and the module power output cable 178 extends from the base housing 166. Within the base housing 166 the cables 174, 178 are connected to body interface 60 and/or each other in any desired manner. For example, within the base housing 166 the cables 174 can be connected to one another in ways that are electrically equivalent to configurations depicted in FIG. 15-18. Further, one or more power conditioning apparatus can be provided within the base housing 166 as desired.

Continuing with reference to FIG. 18, an existing luminaire 20 can be easily retrofitted to accommodate a module by simply detaching the luminaire power cable 176 from the AC input power 80 and connecting it instead to the module power output cable 178, while connecting the module power cable 174 to the AC input power 80. Of course, it is to be understood that, in some embodiments, a communication line 180 can also be provided extending from the base housing 166. In embodiments in which the luminaire 20 is a smart luminaire, the communication line 180 can be connected so as to communicate with the luminaire's processor 120. In embodiments in which the luminaire 20 is a dumb luminaire, the communication cable may go unused, or a module base 160 not equipped with a communication line may be selected.

Figure 19:
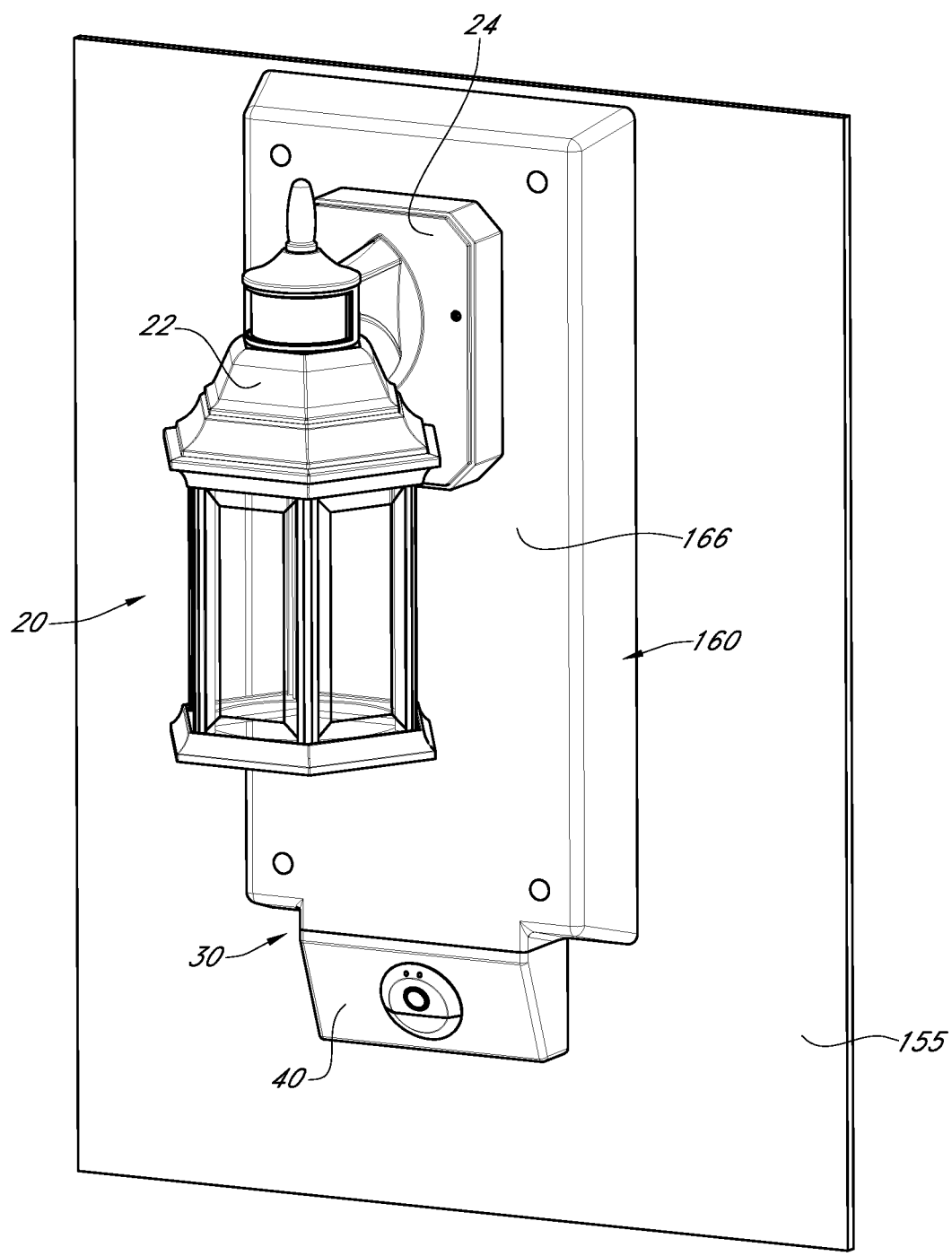
FIG. 19. is a perspective view of another embodiment of a luminaire system configured to receive a module.

With reference next to FIG. 19, another embodiment is illustrated in which the module base 160 is configured to be mounted to the wall 155 so as to align with and cover the AC input power 80. In this embodiment the module base 160 comprises a base housing 166 configured to accept both the module 40 and luminaire 20 mounted thereon. The base housing 166 encloses a space for connections between AC input power 80, the luminaire power cable 176, module power cable 174 and/or the module power output cable 178 (in embodiments employing such). Any desired power conditioning apparatus can also be enclosed within the base housing 166.

In the illustrated embodiment, the base housing 166 includes a module receiver 30 to which a module 40 can be selectively attached. The illustrated module receiver 30 is disposed along a bottom portion of the base housing 166. It is to be understood that the base housing 166 can be configured to locate the module receiver in another location. And, in some embodiments, the base housing 166 can comprise a plurality of module receivers.

In the illustrated embodiments the module receiver 30 and module 40 are depicted fitting complementarily to one another. It is to be understood that, in additional embodiments, the module may be mounted separately from the module receiver, without physically fitting within the module receiver. Preferably, however, the module and module receiver will include the interface(s) to enable communication of electricity and/or control signals as discussed herein.

In the illustrated embodiments, power to the luminaire 20 has been an AC power supplied via the structure to which the luminaire 20 is mounted. It is to be understood that, in some embodiments, the structure may be configured to supply a DC input power to the luminaire. In still further embodiments the luminaire and/or the module and/or the module base may be configured with its own power source, such as a solar array and/or generator. Further, in some embodiments a communication line between the module and the luminaire may comprise a wire. In additional embodiments, the communication line can comprise a wireless connection including, for example, Bluetooth, WLAN or any other form of wireless communication.

The embodiments discussed above have disclosed structures with substantial specificity. This has provided a good context for disclosing and discussing inventive subject matter. However, it is to be understood that other embodiments may employ different specific structural shapes and interactions. Also, the peripheral structures discussed herein have been discussed as non-limiting examples. It is to be understood that modules can incorporate one or a combination of any of various peripheral structures having functionality and technical development that is currently known or is not currently known. In fact, one inventive principle addressed in this specification is that a native luminaire 20 having limited functionality can be improved, expanded and updated in view of improving technology by switching out modules while maintaining the basic native luminaire 20. As such, luminaires become future-proof and can be modified to take advantage of constantly-improving technologies simply by replacing a module.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. For example, specific peripheral structures that may have been discussed herein in connection with one embodiment may also be advantageously employed with another embodiment. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A luminaire system, comprising:
    a native luminaire having a luminaire body and a light mount configured to support a lighting element, the luminaire body configured to be mounted on a structure;
    a module base configured to be mounted on the structure independently of the luminaire body and comprising a module receiver and a power line, the module receiver including a body interface, the power line configured to connect to a power input source and communicate electricity from the power input source to the body interface;
    a communication line extending from the module base to the luminaire body;
    a module comprising a module body having a module coupler, the module coupler configured to be selectively physically coupled with the module receiver so that the module body is physically coupled with the module base;
    the module body enclosing a module electrical structure comprising a module interface, a module processor unit and a peripheral functional structure; and
    the luminaire body enclosing a native electrical structure configured to receive electricity from one or more of the power input source and the module, the native electrical structure comprising a luminaire processor arranged and configured to control delivery of power to the lighting element;
    wherein when the module coupler is physically coupled with the module receiver, the body interface is electrically coupled with the module interface so that electricity from the power input source is communicated from the body interface to the module interface and to the module processor unit, and the module processor unit communicates data with the luminaire processor via the communication line.

2. The luminaire system of claim 1, wherein a power output line extends from the body interface to the native electrical structure.

3. The luminaire system of claim 2, wherein when the module body is physically coupled to the module base, the module processor unit controls delivery of power from the power input source to the lighting element.

4. The luminaire system of claim 3, wherein an input portion of the body interface communicates an input electricity from the power line to the module and an output portion of the body interface communicates an output electricity from the module to the power output line, and wherein the module comprises a power conditioning structure configured to be controlled by the module processor unit.

5. The luminaire system of claim 4, wherein the power conditioning structure is one of an on/off switch and a dimmer.

6. The luminaire system of claim 1, wherein the luminaire body is configured to be mounted on the structure at a location spaced from the module base.

7. The luminaire system of claim 1, wherein the peripheral functional structure comprises a wireless communication structure configured to enable wireless communication of data between the module processor unit and a remote computing device.

8. The luminaire system of claim 6, wherein the peripheral functional structure comprises one or more of a sensor, camera, microphone, and speaker in communication with the module processor unit, and wherein data from the peripheral functional structure is processed locally or shared with the remote computing device.

9. The luminaire system of claim 1, wherein the module processor unit is configured to control the native processor unit.

10. The luminaire system of claim 1, comprising a plurality of modules, each module comprising a module body configured to be selectively coupled with the module receiver so that each module body can be selectively physically coupled with the module base so that the body interface is electrically coupled with the module interface.

11. The luminaire system of claim 10, wherein a first one of the plurality of modules comprises a battery and a power conditioner configured to convert battery power from DC to AC and selectively deliver AC power to the module interface, and wherein the native electrical structure is configured to communicate AC power from the body interface to the lighting element.

12. The luminaire of claim 1, wherein the module base comprises a main switch interposed between the power line and the body interface, and wherein a native position of the main switch is open between the power line and the body interface so that no electricity is communicated from the power line to the body interface when the main switch is in the native position.

13. The luminaire of claim 12, wherein the main switch is configured so that when the module is coupled with the module receiver, the main switch is moved from the native position to a connected position in which the power line is electrically connected to the body interface.

14. A method of modifying functionality of a native luminaire that is supported by a luminaire base mounted to a permanent structure, comprising:
    mounting a module base to the permanent structure independently of the luminaire base;
    electrically connecting the module base to a power source so that an input interface of the module base is electrically coupled to the power source;
    electrically connecting an output interface of the module base to a native electrical structure of the native luminaire, the native luminaire having a luminaire body defining a lighting mount configured to support a lighting element, the native electrical structure configured to communicate electricity to the lighting mount, and electric power from the power source passes through the module base before flowing to the native electrical structure, wherein the module base having a default electrical path communicating the power source with the native electrical structure;
    coupling a first module to the module base, wherein coupling the first module to the module base comprises engaging the input interface of the module base with a module input interface of the first module and engaging the output interface of the module base with a module output interface of the first module so that electricity is communicated from the power source to a first module electrical structure, the first module electrical structure configured to provide power to a module processing unit and a peripheral functional structure, and wherein coupling the first module to the module base comprises interrupting the default electrical path in the module base so that the native electrical structure receives power from only the module output interface;

the peripheral functional structure obtaining peripheral data and communicating the peripheral data to the module processing unit;

the module processing unit analyzing the peripheral data and selecting a control routine based on the analysis; and the module processing unit controlling a power conditioning structure of the module to adjust an output power communicated to the module output interface in accordance with the selected control routine.

15. The method of claim 14, additionally comprising the module processing unit controlling the peripheral functional structure in accordance with the selected control routine.

16. The method of claim 14, comprising providing a kit comprising the module base, a module power cable configured to deliver power to the module base, and a module power output cable configured to deliver power from the module base, electrically coupling the module power cable to the power source, and electrically coupling the module power output cable to the native electrical structure of the native luminaire.

* * * * *